United States Patent
Kano et al.

(10) Patent No.: US 7,349,202 B2
(45) Date of Patent: Mar. 25, 2008

(54) DATA PROCESSING DEVICE

(75) Inventors: Tomohisa Kano, Shioziri (JP); Toshiya Matsuse, Shioziri (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 11/365,173

(22) Filed: Feb. 28, 2006

(65) Prior Publication Data

US 2006/0198094 A1   Sep. 7, 2006

(30) Foreign Application Priority Data

Feb. 28, 2005  (JP) .............................. 2005-052927
Feb. 28, 2005  (JP) .............................. 2005-052928

(51) Int. Cl.
*H05K 5/00* (2006.01)

(52) U.S. Cl. ..................... 361/683; 428/319.3; 345/60; 248/179.1

(58) Field of Classification Search ............. 248/179.1; 428/315.5, 304.4, 319.3; 348/189; 345/60, 345/333.1; 361/679–687, 724–727
See application file for complete search history.

(56) References Cited

U.S. PATENT DOCUMENTS

| | | | |
|---|---|---|---|
| 5,257,164 A | | 10/1993 | Perez et al. |
| 6,507,710 B1 * | | 1/2003 | Koike et al. ................. 396/315 |
| 2001/0002130 A1 * | | 5/2001 | Suzuoki ........................ 345/420 |
| 2002/0018134 A1 * | | 2/2002 | Tsukahara et al. ..... 348/333.01 |
| 2002/0018307 A1 * | | 2/2002 | Nagaoka ...................... 359/833 |
| 2005/0163558 A1 * | | 7/2005 | Lee .............................. 403/45 |

FOREIGN PATENT DOCUMENTS

EP    0 731 430 A    9/1996

(Continued)

OTHER PUBLICATIONS

European Search Report for 06003811.4-2224; issued Apr. 6, 2006.

*Primary Examiner*—Hung Van Duong
(74) *Attorney, Agent, or Firm*—John J. Penny, Jr.; Edwards Angell Palmer & Dodge LLP

(57) ABSTRACT

A data processing device is described, having on its front a large display device, in which the tilt angle of the display device is adjustable whether the main unit of the data processing device is positioned either vertically or horizontally. A display device mounting unit 70 rendered at the front top part of the main unit 20 has a curved recessed portion 71 which when seen in section curves at an angle from the front to the inside of the main unit 20. A mounting member 50 having a curved surface 51 that is convex in section is attached so that the mounting member 50 can slide along the arc of the curved recessed portion 71. The mounting member 50 is also fastened to the top or bottom end of the back of the display device 30. Sliding the mounting member 50 along the arc of the display device mounting unit 70 when the display device 30 is installed to the main unit 20 enables adjusting the tilt angle of the display device 30. Because the display device mounting unit 70 is at the front top of the main unit 20 in both vertical and horizontal orientations, the display device 30 can be installed and adjusted whether the main unit 20 is placed vertically or horizontally.

20 Claims, 23 Drawing Sheets

FOREIGN PATENT DOCUMENTS

| | | |
|---|---|---|
| EP | 1 016 950 A | 7/2000 |
| JP | 09-245252 A5 | 9/1997 |
| JP | 2000-010495 A5 | 1/2000 |
| JP | 2000-338891 A | 12/2000 |
| JP | 2002-074921 | 3/2002 |
| JP | 2002-074921 A5 | 3/2002 |
| JP | 2002-134932 | 5/2002 |
| JP | 2002-134932 A5 | 5/2002 |
| JP | 2002-227763 A5 | 8/2002 |

\* cited by examiner

DATA PROCESSING DEVICE

BACKGROUND OF THE INVENTION

1. Field of Technology

The present invention relates to a data processing device that has a display device disposed at the front of the main unit housing the host device and can be placed either vertically or horizontally for use, and relates more particularly to a data processing device that enables adjusting the tilt angle of the display device whether the data processing device is placed in the vertical or horizontal position.

2. Description of Related Art

Data processing devices such as personal computers, point-of-sale (POS) terminals, and electronic cash registers are increasingly equipped with large flat panel display devices such as LCD's and plasma displays. More particularly, a data processing device having the display device disposed to the main unit in which the host device is housed as taught in Japanese Unexamined Patent Appl. Pub. 2000-227763 renders the display device at the front of the main unit so that the operator can view the display while operating the data processing device, and has a tilt mechanism that enables the operator to adjust the angle of the display device so that the display is easier to read.

Furthermore, the footprint and height of the data processing device generally differ according to whether the data processing device is installed in the vertical or horizontal orientation, and the data processing device can preferably be installed in either the vertical or horizontal orientation according to the available installation space. In restaurant and fashion boutiques, for example, design considerations and the desire to use space efficiently make the ability to install the data processing device either vertically or horizontally especially desirable. Switching between vertical and horizontal orientations also changes the position of the operating keys and display device 90 degrees and thus degrades operability and display readability. As a result, Japanese Unexamined Patent Appl. Pub. 2002-134932 teaches a means of rotating the operating unit at least 90 degrees according to whether the electronic device is used vertically or horizontally, and Japanese Unexamined Patent Appl. Pub. 2002-74921 teaches a means of rotating the display unit according to the vertical or horizontal orientation of the electronic device.

In addition to the operator's display, point-of-sale ("POS") terminals and electronic cash registers, for example, also typically have a customer display for displaying the purchased products and prices for the customer to see. As shown in FIG. 1 and FIG. 3 in Japanese Unexamined Patent Appl. Pub. H9-245252, for example, the customer display is commonly disposed at the top rear portion of the POS terminal so that the customer display can pivot or swing to face the customer. A problem with this customer display, however, is that repeatedly swinging the customer display can cause the signal cable to become twisted and eventually fail. Japanese Unexamined Patent Appl. Pub. 2000-10495 addresses this problem by connecting the cable that connects to the customer display to a rotatable conductive sliding device that prevents the cable from becoming twisted and thus failing.

Recent POS terminals and electronic cash registers increasingly tend to use a large front display device as the customer display while the size of the main unit has become smaller in order to reduce the footprint. As a result, the display device may be larger than the main unit. Furthermore, rotating a large display device according to the vertical or horizontal orientation of the electronic device is difficult or requires a complicated mechanism with the technology taught in Japanese Unexamined Patent Appl. Pub. 2002-134932 and Japanese Unexamined Patent Appl. Pub. 2002-74921. In addition, Japanese Unexamined Patent Appl. Pub. 2000-227763 does not teach a tilt mechanism that anticipates use in either a vertical or horizontal orientation, and provides no consideration for adjusting the angle of the display device according to the vertical or horizontal orientation.

Furthermore, the customer display taught in Japanese Unexamined Patent Appl. Pub. H9-245252 simply rotates on a vertical support column, and where the customer display can be installed is thus limited. As the integration of data processing devices increases, device size thus decreases, and the size of the operator display increases, less room is available for locating the customer display and printer. Where the customer display can be installed is particularly limited with a data processing device that can be installed vertically or horizontally, and a conventional customer display installed on a vertical pole in particular significantly limits the freedom of design in the data processing device. While the customer display can be freely pivoted by using a rotatable conductive sliding device as taught in Japanese Unexamined Patent Appl. Pub. 2000-10495, this conductive sliding device increases device cost and the likelihood of poor electrical contact and signal noise.

The present invention is directed to solving these problems of the prior art, and an object of the invention is to provide a data processing device having a relatively large display device disposed at the front of the data processing device so that the data processing device can be used in either a vertical or a horizontal orientation without changing display control while using the same display device in both vertical and horizontal installations.

A further object of the invention is to provide a data processing device that can use the same display device in both vertical and horizontal orientations and enables adjusting the tilt angle of the display in either orientation.

A yet further object of the invention is to provide a data processing device to which peripheral devices rendering additional functionality, such as input functions, can be connected to the side of the display device, and the data processing device can be installed vertically or horizontally without changing where the peripheral device is connected.

A yet further object of the present invention is to provide a data processing device having a customer display device that improves the freedom of design related to the connection of the customer display device whether the data processing device is installed vertically or horizontally.

SUMMARY OF THE INVENTION

To solve the problems described above, the present invention provides a display device mounting unit having a curved recessed portion which in section has an arc with a specific radius of curvature rendered at the front top part of the main unit in which the host device is housed whether the main unit is placed vertically or horizontally, and a mounting member for mounting the display device to the display device mounting unit so that the mounting member can slide along the arc of the curved recessed portion of the display device mounting unit. Whether the main unit is placed vertically or horizontally, this mounting member enables installing the display device without the top and bottom ends of the display device become reversed, and enables adjusting the tilt angle of the display device in both vertical and horizontal positions.

A data processing device according to a first embodiment of the invention having a main unit that can be used vertically or horizontally, and a display device mounted to the front of the main unit. The data processing device comprises a display device mounting unit that is part of the main unit housing and comprises a curved recessed portion forming an arc diagonally from the front part of the main unit toward the inside of the main unit, and guide rails rendered along the arc of the curved recessed portion; a mounting member comprising a convex curved surface which in section has a matching radius of curvature as the curved recessed portion, and slide rails disposed to the convex curved surface that work in conjunction with the guide rails; and a display device to the back of which is attached the mounting member. Whether the main unit is placed vertically or horizontally, the display device can be mounted to the display device mounting unit without reversing the top and bottom of the display device by inserting the slide rails to the guide rails, and the tilt angle of the display device can be adjusted by sliding the slide rails along the guide rails.

Because the display device mounting unit is located at the front top part of the main unit in both vertical and horizontal orientations, the display device can always be installed at the front of the main unit. Furthermore, because the slide rails of the mounting member are inserted to the guide rails of the curved recessed portion of the display device mounting unit, and the display device is supported by the entire curve of the curved recessed portion, the display device is durably supported on the main unit. The tilt angle of the display device can also be adjusted in fine increments by sliding the display device along the support arc.

In a data processing device according to another embodiment of the invention, when the top to bottom length of the display device is greater than the length of the line subtending the two ends of the curvature of the mounting member, the installation position of the mounting member is changed according to the vertical or horizontal placement of the main unit so that one end of the mounting member is set near the bottom end or top end part of the display device.

By thus enabling fastening of the mounting member to either end of the display device according to the vertical or horizontal placement of the main unit, the display device can be installed so that the tilt angle of the display device can be adjusted even when the top to bottom length of the display device exceeds the length of the clearance provided by the curvature of the curved recessed portion. The tilt angle can thus be adjusted according to the vertical or horizontal placement of the main unit even when using a relatively large display device.

In a data processing device according to yet another embodiment of the invention, the mounting member is removably attached to the display device.

Removably fastening the mounting member to the display device includes fastening the mounting member with screws, hooks, claws, or other mechanical means, snap-fit connections, adhesive connections using double sided tape, hook and loop connections, and other known methods. Using screws to secure the mounting member enables installing the mounting member to the display device reliably and accurately with a simple construction. Using claws or a snap-fit arrangement enables attaching the mounting member with great ease.

In a data processing device according to yet another embodiment of the invention, the mounting member is mounted movably to the display device, and the mounting member is moved and fastened to the display device so that the top end or bottom end part of the mounting member is near the bottom end or top end part of the display device according to the vertical or horizontal placement of the main unit.

Thus moving the mounting member makes it even easier to change the position to which the mounting member is fastened.

In a data processing device according to yet another embodiment of the invention, the display device comprises an input device.

The input device could be, for example, a touch panel rendered on the display screen of the display device, or a keyboard or card reader directly attached to the side of the display device. All or only some of these devices could be connected to the display device.

In a data processing device according to yet another embodiment of the invention, a display device mounting unit is removably attached to the main unit for mounting a customer display device according to the vertical or horizontal placement of the main unit. This embodiment of the invention enables installing a customer display device for viewing by the customer whether the main unit is in the vertical or horizontal position.

In a data processing device according to yet another embodiment of the invention, the customer display device mounting unit comprises: a first support column and a second support column substantially parallel to each other with a space between them; an arm connecting the top end of the first support column to the bottom end of the second support column, whose length determines the space separating the two support columns; a customer display device connected to the top end of the second support column so that the tilt angle can be adjusted; and at least a first connector unit pivotally connected to the first support column, with an optional second connector unit pivotally connected to the second support column.

With this embodiment of the invention the customer display device is connected to the second support column so that the customer display device can tilt, and the second support column can pivot on its axis by means of the second connector unit. As a result, the customer display device can pivot on the second support column to face a different direction, and the angle of the customer display device can also be tilted vertically as desired. The second support column is also connected to the first support column by an arm, and the arm can pivot on the first support column by means of the first connector unit. The customer display device can therefore move through a range of which the radius is determined by the arm. The first connector unit could be the mounting unit for installing the first support column to the POS terminal unit, or the connector unit between the first support column and the arm. The second connector unit could be the connector unit between the second support column and the arm, or the connector unit between the second support column and the customer display device.

In a data processing device according to yet another embodiment of the invention, the arm and the second support column are integrally formed in an L-shaped arrangement.

Rendering the second support column and arm in unison reduces the parts count. Because there is no connector unit between the second support column and the arm in this arrangement, the second connector unit is the connector unit between the customer display device and the part corresponding to the L-shaped second support column. This makes assembly easier and reduces the parts count, and thus also reduces production cost.

In a data processing device according to yet another embodiment of the invention, the first connector unit and the second connector unit incorporate a rotation prevention mechanism preventing a pivot unit from rotating more than a predetermined angle of rotation.

This arrangement prevents both the first and second connector units from rotating more than 360 degrees. If rotation of more than one full revolution is possible, rotating the members more than once in the same direction can damage the cables inside.

In a data processing device according to yet another embodiment of the invention, the rotation prevention mechanism comprises a rotation prevention rib incorporated into the pivot unit, and a stop incorporated into the mating surface of the connector unit that contacts the rotation prevention rib when the pivot unit rotates a predetermined angle.

If the pivot unit rotates to the predetermined angle, the rotation prevention rib and stop engage and thus stop further rotation.

The present invention thus enables the main unit in which the host device is housed to be placed either vertically or horizontally, and provides a display device mounting unit having an arc recessed diagonally from the front of the main unit to the inside of the main unit at the front top part of the main unit when the main unit is placed vertically or horizontally. The display device is installed so that the display device can slide along the display device mounting unit, thus enabling the tilt angle of the display device to be adjusted in both vertical and horizontal orientations.

The display device can also be installed onto the main unit in both vertical and horizontal orientations without the top and bottom ends of the display device becoming inverted. As a result, if a peripheral device with an input function (such as a directly connected keyboard, magnetic stripe reader or other card reader, or other type of input device), for example, is attached to the display device, the display device can be installed to the main unit without changing the peripheral device attachment to the display device. Manufacturing cost can therefore be reduced because it is not necessary to provide a new attachment mechanism or different types of connectors and other parts.

Furthermore, by mounting the customer display device using two parallel support columns connected and separated a predetermined distance by an arm, and providing connector units enabling both support columns to pivot independently of the other, the customer display device can be moved and adjusted though a wide range of motion. The customer display device can therefore be moved to a desirable position whether the main unit is placed vertically or horizontally.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures. A POS terminal device is described by way of example as a preferred embodiment of a data processing device according to the present invention.

Figure 1:
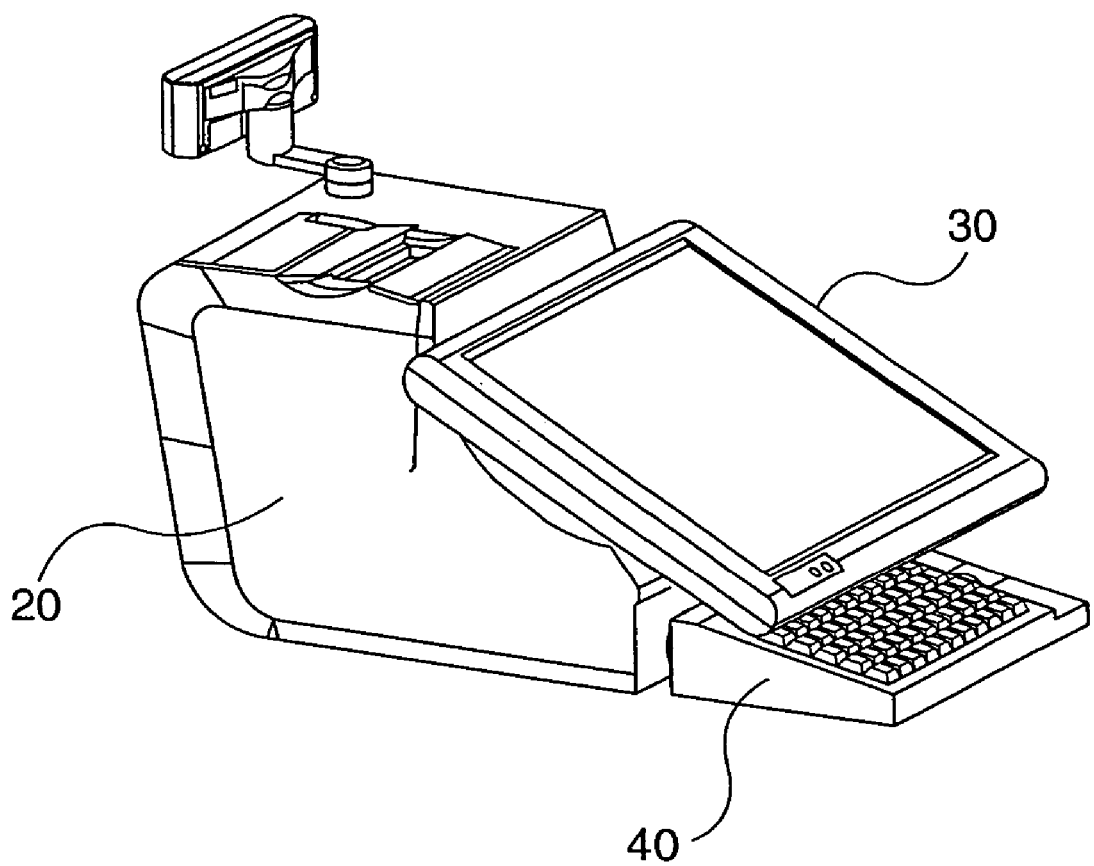
FIG. 1 is a perspective view showing a POS terminal according to a preferred embodiment of the invention in the horizontal position.
Figure 2:
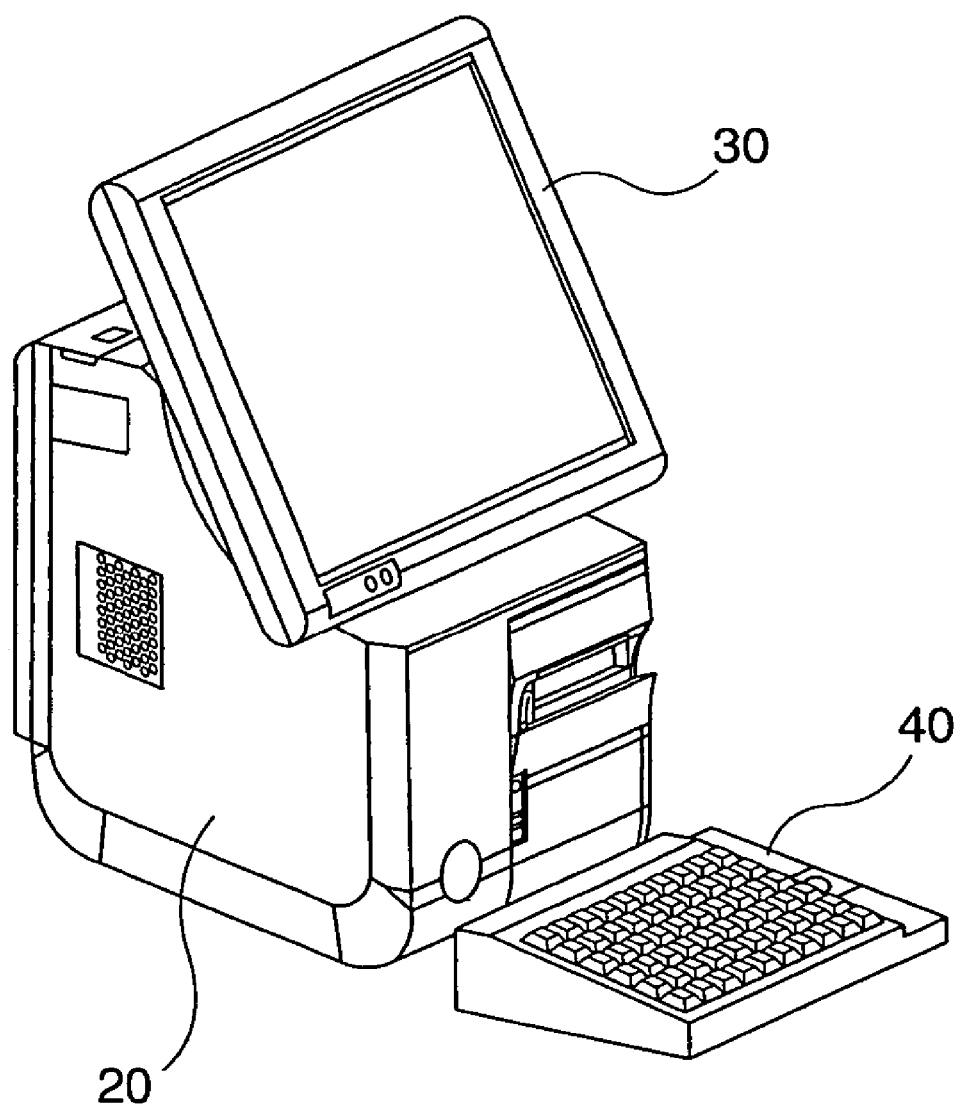
FIG. 2 is a perspective view of the POS terminal shown in FIG. 1 when used upright.
Figure 3A:
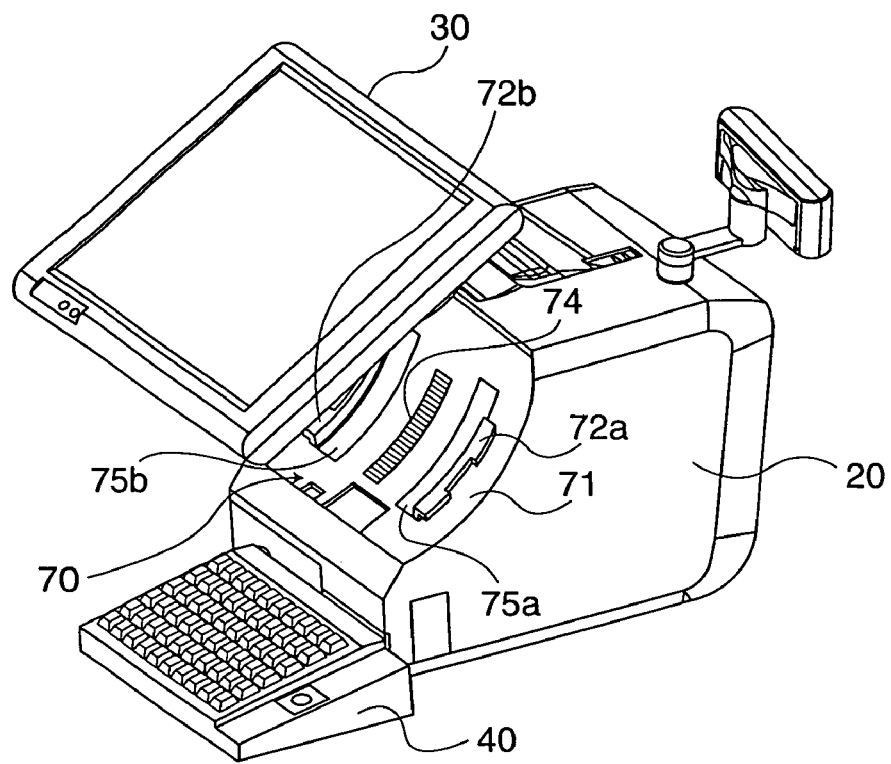
FIG. 3A is an exploded perspective view of the main unit and display device of the POS terminal shown in FIG. 1.
Figure 3B:
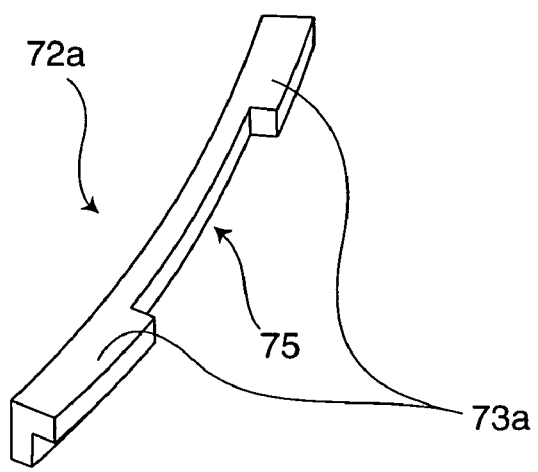
FIG. 3B is an enlarged view of the mounting guide and guide rails, which are positioned on the recessed, curved portion of the main unit.
Figure 4:
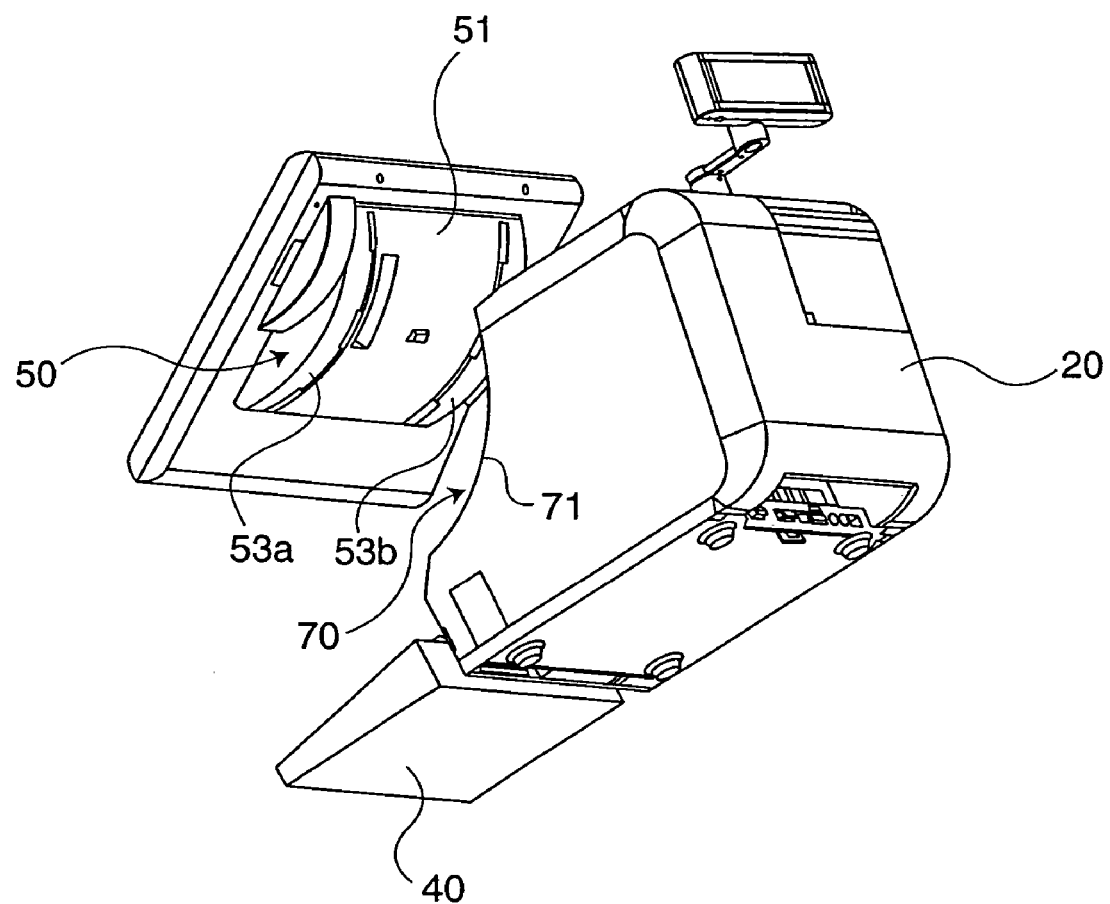
FIG. 4 is an exploded perspective view from the bottom of the POS terminal shown in FIG. 1.

FIG. 1 is a perspective view of a POS terminal according to this first embodiment of the invention when installed horizontally. FIG. 2 is a perspective view showing the POS terminal placed vertically. FIG. 3A is an exploded perspective view showing the main unit of the POS terminal and the display device, and FIG. 3B is an enlarged perspective view of the installation guide. FIG. 4 is an exploded perspective view from diagonally below the POS terminal as shown in FIG. 3A.

The POS terminal 10 consists of the main unit 20 housing the host device and printer, for example, a flat panel display device 30 such as an LCD monitor, and a keyboard 40. A display device mounting unit 70 (see FIG. 3) rendered in the main unit 20 has a concavely arc-shaped recessed portion (curved recessed portion) recessed toward the inside of the main unit 20 and formed from the front top part to the lower front part of the main unit 20.

The display device mounting unit 70 has a curved recessed portion 71 rendered as a curved surface when seen in section. Two mounting guides 72a and 72b are rendered protruding from the surface on the right and left sides of the curved recessed portion 71. The mounting guides 72a and 72b are identically shaped and are affixed facing in opposite directions. Mounting guide 72a is shown in FIG. 3B. As shown in FIG. 3B, the mounting guide 72a has top and bottom guide rails 73a rendered with a gap therebetween.

The two guide rails 73a each have a flat plate member of a specific width projecting to the outside, and guide rails 73a slide in conjunction with slide rail 53a of the display device mounting member 50. See FIG. 4 and FIG. 5. Mounting guide 72b also has two guide rails 73b (not shown in the figure), and these guide rails 73b likewise slide in conjunction with slide rail 53b of the mounting member 50.

A rack 74 with a series of numerous fine teeth is formed in the middle of the curved recessed portion 71 along the arc of the curved recessed portion 71 (see FIG. 3A). A positioning claw 56 further described below engages this rack 74 to prevent the display device from sliding freely. The two vertically oblong holes shown in FIG. 3 are cable openings 75a and 75b for passing power and data cables to the display device 30, for example.

As shown in FIG. 4, a mounting member 50 having a convex curved surface 51 with the same radius of curvature as the curved recessed portion 71 is affixed to the back of the display device 30. The slide rails 53a and 53b noted above are rendered to the curved surface 51 of the mounting member 50.

When the mounting member 50 is fastened to the back of the display device 30, the display device 30 can be attached as shown in either FIG. 1 or FIG. 2 by engaging slide rails 53a and 53b with the mounting guides 72a and 72b (see FIG. 3) of the display device mounting unit 70. The display device 30 can slide along the arc of the curved recessed portion 71, and the angle (tilt angle) of the display device 30 can be adjusted as desired by sliding the display device 30 along the arc of the curved recessed portion 71. More specifically, the display device 30 can be slid up or down to increase the tilt angle by sliding the display device 30 up to a more upright or vertical position, or decrease the tilt angle by sliding the display device 30 down to a more horizontal position.

Arrangement of the Mounting Member 50

Figure 5:
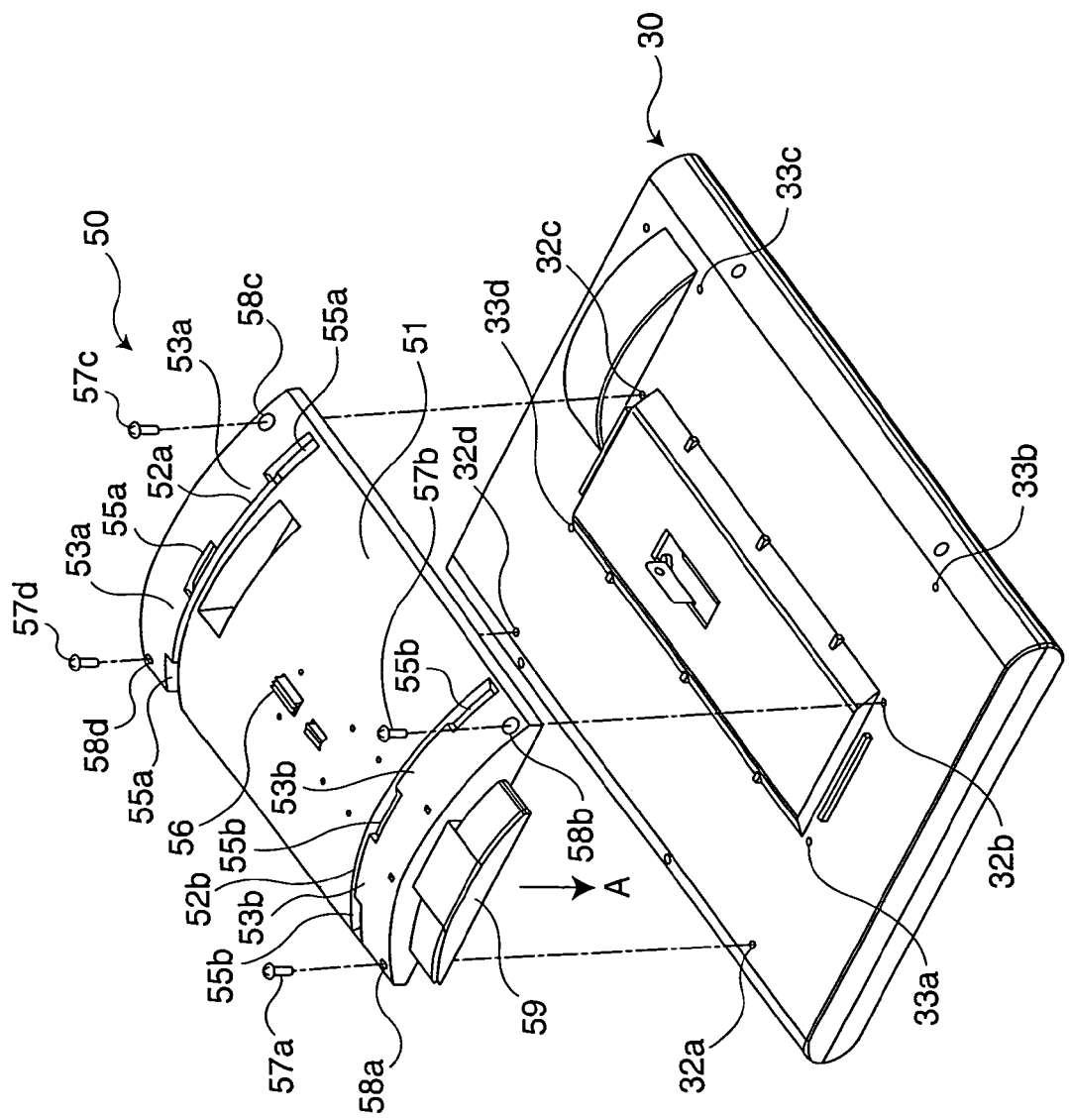
FIG. 5 is an exploded perspective view showing the mounting member in a first embodiment of the invention and an example of where the mounting member is attached to the back of the display device.

FIG. 5 is an exploded perspective view showing the mounting member 50 according to this embodiment of the invention and where the mounting member 50 is attached to the back of the display device 30. Two slide channels 52a and 52b are rendered on the right and left sides of the mounting member 50 along the slide rails 53a and 53b. Notches 55a and 55b are formed at three locations in each of the slide channels 52a and 52b. The inside of the slide channels 52a and 52b is a hollow channel equal in width to the notches 55a and 55b.

A positioning claw 56 with a plurality of teeth on the outside end is formed in the middle of the curved surface 51 of the mounting member 50. When the mounting member 50 is engaged with the display device mounting unit 70, the ends of the positioning claw 56 mesh with the rack 74 (FIG. 3A). This fixes the position of the display device 30 and prevents the display device 30 from sliding freely.

Figure 14:
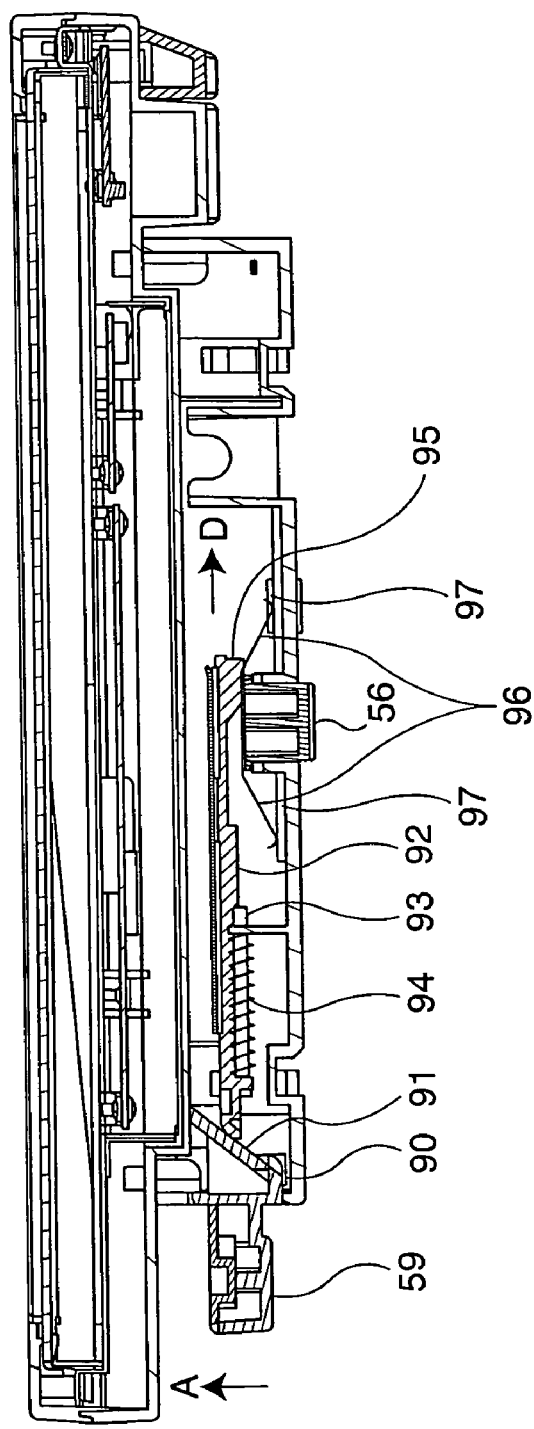
FIG. 14 is a section view when the angle adjustment lever in the locked position.
Figure 15:
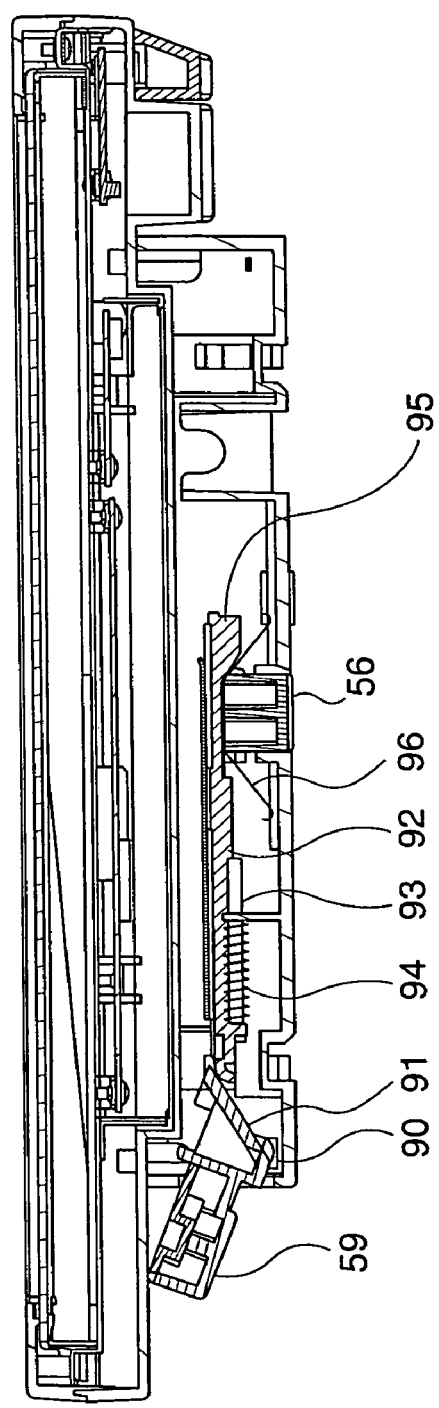
FIG. 15 is a section view when the angle adjustment lever is moved in the direction of arrow A as shown in FIGS. 5 and 14.

The positioning claw may be retracted for adjustment of the angle of the display device by manually depressing the angle adjustment lever 59 shown in FIG. 5. Moving the angle adjustment lever 59 in the direction of arrow A as shown in FIG. 14 causes the positioning claw 56 to retract to the inside of the mounting member 50. FIG. 14 and FIG. 15 are section views showing an example of a mechanism for moving the positioning claw 56 as a result of operating the angle adjustment lever 59. FIG. 14 shows the locked position when the angle adjustment lever 59 is not moved in the direction of arrow A, and FIG. 15 shows the positioning claw 56 after the angle adjustment lever 59 is moved in the direction of arrow A. Hatching is added in FIG. 14 and FIG. 15 only to those parts that are needed to describe this operation.

The positioning claw 56 is rendered so that it can slide in the normal direction (up and down as seen in FIG. 14 and FIG. 15) relative to the curved surface of the curved recessed portion 71, and a leaf spring 96 is attached to the positioning claw 56. In the position shown in FIG. 5 and FIG. 14 (referred to below as the "home position"), the positioning claw 56 is pressed downward from above by the lock unit 95 rendered on the distal end of the retraction lock unit 92, and the leaf spring 96 is thus pressed down and deformed. The leaf spring 96 is held inside a leaf spring receiver rib 97 so that the leaf spring 96 can slide laterally left-right as seen in FIG. 14 and FIG. 15, and thus spreads to the sides when depressed by the lock unit 95. The positioning claw 56 is thus urged upward (to the inside of the mounting member 50) as seen in FIG. 14 by the deformed leaf spring 96. A coil spring 94 held on a spring pin 93 urges the retraction lock unit 92 to the left as seen in FIG. 14 with greater force than is exerted by the leaf spring 96. As a result, the position shown in FIG. 14 is held by the coil spring 94 unless external force is applied.

The angle adjustment lever 59 is rendered so that it can pivot on pivot point 90. When angle adjustment lever 59 is moved circularly in the direction of arrow A, the working end 91 works against coil spring 94 and moves the retraction lock unit 92 in the direction of arrow D. The lock unit 95 thus moves in the direction of arrow D, and the positioning claw 56 is lifted upward by the elastic force of the leaf spring 96 as seen in FIG. 14 and FIG. 15. FIG. 15 shows the positioning claw 56 in the upward (inside) retracted position after the angle adjustment lever 59 is lifted in the direction of arrow A. When the angle adjustment lever 59 is released in this position, the force of coil spring 94 returns the angle adjustment lever 59 to the original home position. The lock unit 95 of the retraction lock unit 92 thus moves to the left as seen in FIG. 15, and the inclined surface on the left side of the lock unit 95 pushes the positioning claw 56 downward against the force of the leaf spring 96.

When the angle adjustment lever 59 is in the locked position (as shown in FIG. 5), the lock unit 95 locks the positioning claw 56 in position and prevents the positioning claw 56 from retracting to the inside of the mounting member 50. Because the positioning claw 56 is meshed with the rack 74 at this time, the guide rails 73a and 73b and slide rails 53a and 53b cannot slide, and the display device is held at a specific angle. Applying pressure squeezing the angle adjustment lever 59 toward the front of the display device (in the direction of arrow A) enables the positioning claw 56 to retract inside the mounting member 50. This enables the guide rails 73a and 73b and slide rails 53a and 53b to slide, and thus enables adjusting the tilt angle of the display device. Furthermore, releasing the angle adjustment lever 59 causes the positioning claw 56 to return to the home position protruding externally from the mounting member 50 and lock, thereby holding the display device at the desired tilt angle.

The mounting member 50 is fastened by screws 57a to 57d to the back of the display device 30 (FIG. 5). These screws 57a to 57d are inserted to through holes 58a to 58d and screwed into screw holes 32a to 32d or screw holes 33a to 33d in the back of the display device 30. When the POS terminal 10 is used in the horizontal position, the mounting member 50 is fastened to screw holes 33a to 33d. When the POS terminal 10 is used in the vertical position, the mounting member 50 is fastened to screw holes 32a to 32d. Why the installation position of the mounting member 50 is changed according to the vertical or horizontal orientation of the POS terminal 10 is described further below. Fastening the mounting member 50 to the display device 30 enables mounting the display device 30 by means of the mounting member 50 to the display device mounting unit 70 of the main unit. When the mounting member 50 is fastened to the display device 30, the resulting assembly is referred to below as the "display unit."

Installing the Display Unit to the Main Unit

Installing the display device 30 to the main unit 20 is described next with reference to FIG. 3 and FIG. 5 to FIG. 7. As shown in FIG. 3 and FIG. 5, the display device mounting unit 70 is disposed to a position that is the front top part of the main unit 20 whether the main unit 20 is placed vertically or horizontally.

Comprising part of each mounting guide 72a and 72b of the display device mounting unit 70 are corresponding guide rails 73a and 73b (the guide rail 73a being shown in FIG. 3B). The display unit is mounted to the display device mounting unit 70 by inserting and fitting the slide rails 53a and 53b to the gaps 75 (shown in FIG. 3B) between the guide rails 73a and 73b of the mounting guides 72a and 72b of the display device mounting unit 70. After inserting the slide rails 53a and 53b to the gaps 75, the entire display unit is slid upward so that the slide rails 53a and 53b engage the guide rails 73a and 73b, and the display unit is thus mounted so that the display unit can slide along the guide rails 73a and 73b.

Figure 6:
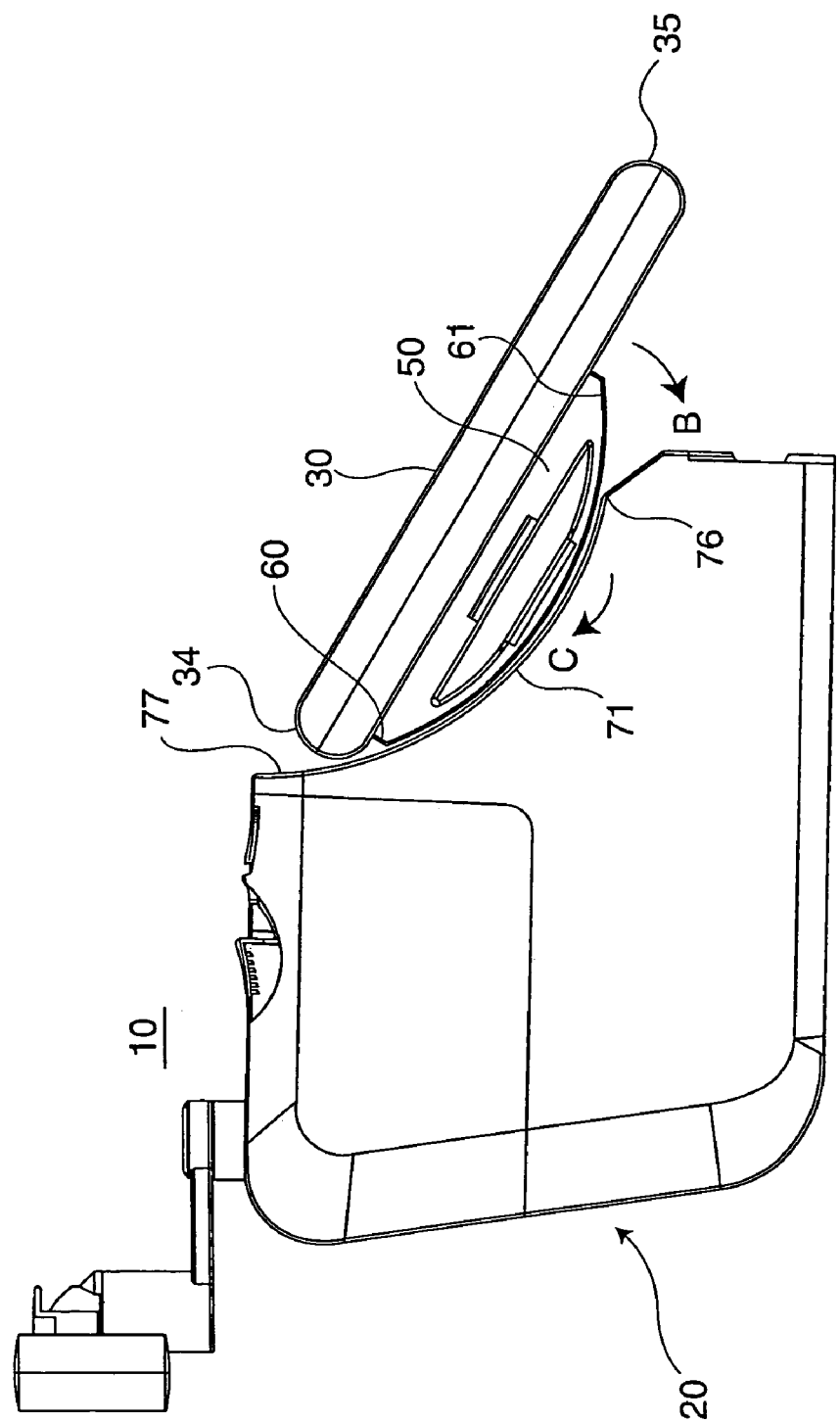
FIG. 6 is a side view of a POS terminal when placed horizontally.
Figure 7:
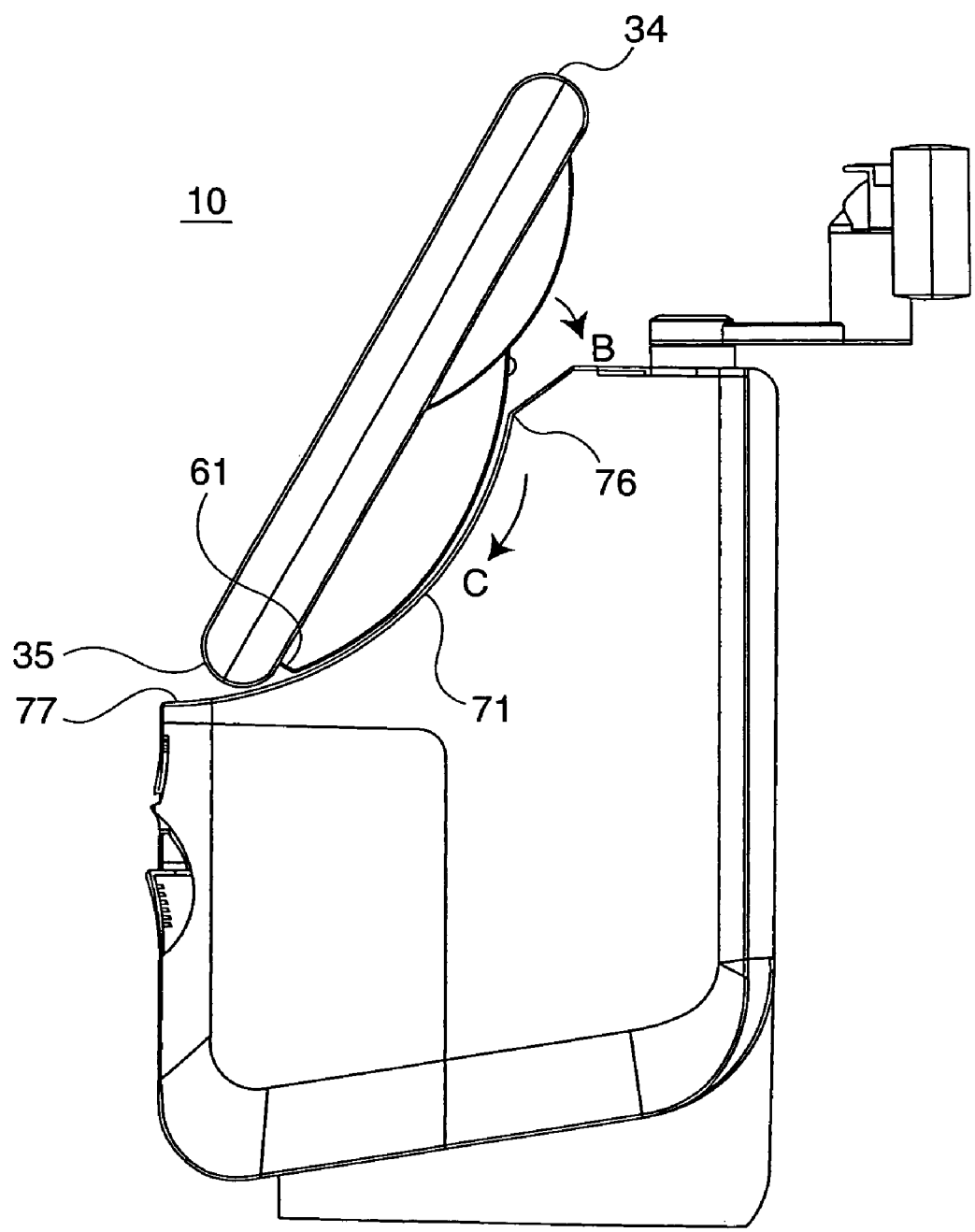
FIG. 7 is a side view of a POS terminal when placed vertically.

FIG. 6 is a side view of the POS terminal 10 when the main unit 20 is placed horizontally. FIG. 7 is a side view of the POS terminal 10 when the main unit 20 is placed vertically. The keyboard 40 is omitted from both figures. The display device 30 is installed so that the top end part 34 is up and the bottom end part 35 is down whether the main unit 20 is placed vertically or horizontally. In both vertical and horizontal orientations, the display device 30 is mounted on the main unit 20 by inserting the slide rails 53a and 53b of the mounting member 50 affixed to the display device 30 into the mounting guides 72a and 72b of the display device mounting unit 70 in the direction indicated by arrow B in FIG. 6 and FIG. 7 near the end portion 76 of the display device mounting unit 70. The slide rails 53a and 53b are inserted to the mounting guides 72a and 72b from the bottom when the main unit 20 is placed horizontally, and from the top when the main unit 20 is placed vertically.

After thus engaging the slide rails 53a and 53b and mounting guides 72a and 72b, the display unit is slid in the direction of arrow C in FIG. 6 to engage the rails (guide rails 73a and 73b, and slide rails 53a and 53b) with each other.

By thus installing the display unit so that the top and bottom ends of the display device 30 are always the same (not reversed), the content displayed on the display device 30 does not need to be inverted according to the vertical or horizontal orientation of the main unit 20, and the need for complicated display control is thus eliminated. A further benefit is that when a peripheral device is connected to the display device 30, it is not necessary to change the position and orientation of the peripheral device according to the vertical or horizontal orientation of the main unit 20. This benefit is further described below.

Installation Position of the Mounting Member 50 on the Display Device 30

Why the position where the mounting member 50 is affixed to the display device 30 is changed according to the vertical or horizontal orientation of the main unit 20 is described next. As shown in FIG. 6 and FIG. 7, when the length from the bottom to the top of the display device 30 is greater than the length of the distance between the ends of the curvature of the mounting member 50 (that is, from end part 60 to end part 61—shown in FIG. 6), the end part 60 or 61 of the mounting member 50 must be set to one end part 34 or 35 of the display device 30. If the end part 34 or 35 of the display device 30 projects from the mounting member 50, the end part 34 or 35 of the display device 30 will interfere with the end portion 76 or 77 of the display device mounting unit 70 or the surface of the curved recessed portion 71, thus preventing mounting the mounting member 50 to the display device mounting unit 70 and preventing sliding the display unit along the curved recessed portion 71. Therefore, in order to mount the display unit on the display device mounting unit 70, at least one end part 34 or 35 of the display device 30 must be offset to one end part 60 or 61 of the mounting member 50 so that the end part 34 or 35 of the display device 30 does not interfere with the display device mounting unit 70. If the mounting member 50 can only be attached to one end part 34 or 35 of the display device 30, the top and bottom ends of the display device 30 must be reversed according to whether the main unit 20 is placed vertically or horizontally. To avoid this, the mounting member 50 can be moved and attached to either end of the display device 30 according to the vertical or horizontal orientation of the main unit 20.

The ability to change the position to which the mounting member 50 is attached affords the following benefits.

Placing the POS terminal 10 horizontally as shown in FIG. 6 reduces the height of the main unit 20. In this situation, the display device 30 is typically used near the bottom position so that the display device 30 is positioned lower. When the POS terminal 10 is placed in the upright position as shown in FIG. 7, however, the display device 30 is typically used in a more upright position. By attaching the mounting member 50 near the top end part 34 when the POS terminal 10 is placed horizontally, this embodiment of the invention increases the adjustment range of the display device 30 in the horizontal direction. When the POS terminal 10 is used in the vertical position, attaching the mounting member 50 near bottom end part 35 likewise increases the adjustment range of the display device 30 in the vertical direction.

Sliding the Mounting Member

Figure 8:
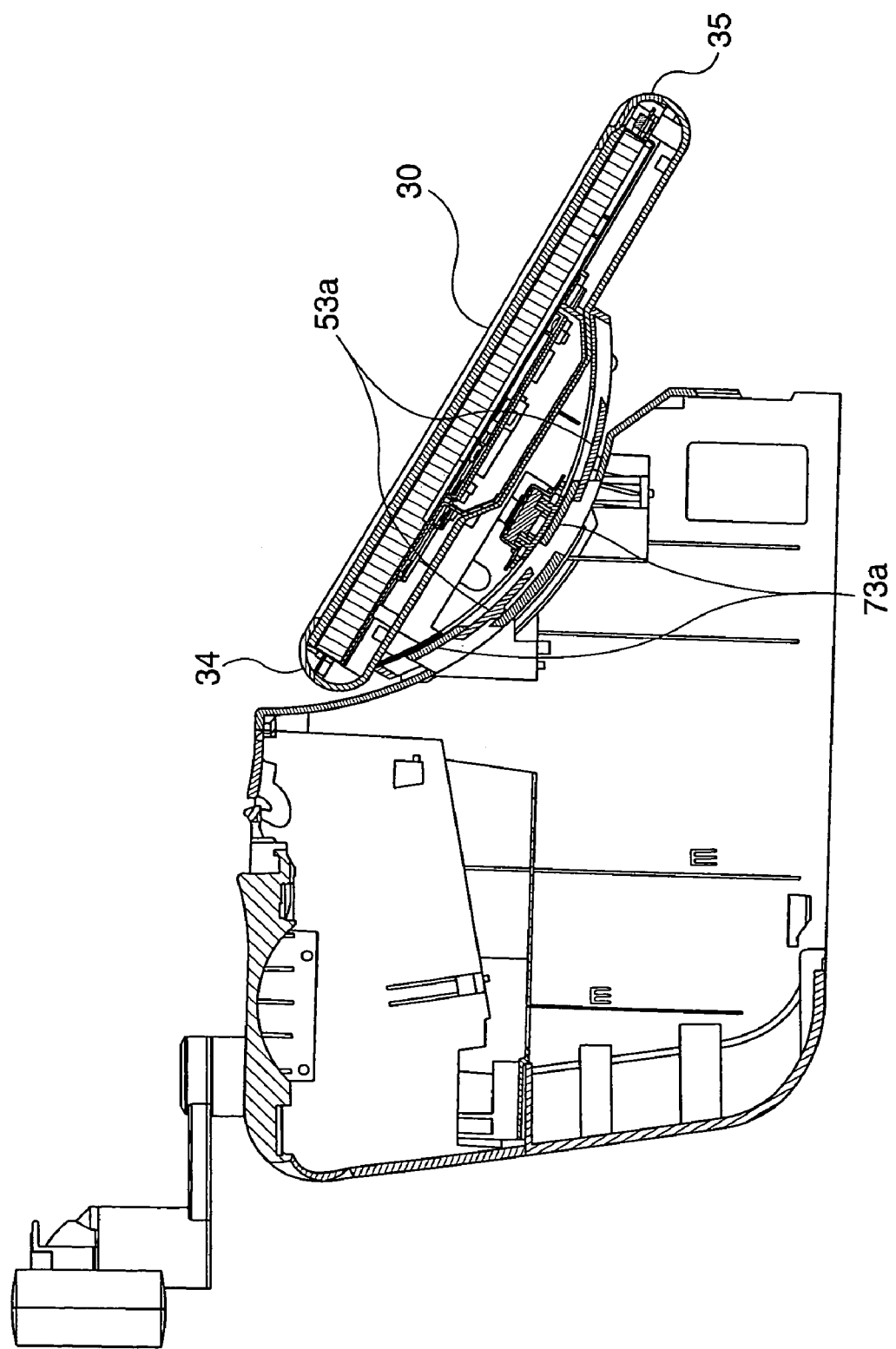
FIG. 8 is a vertical section view through the slide rails and guide rails when the POS terminal is placed horizontally.
Figure 9:
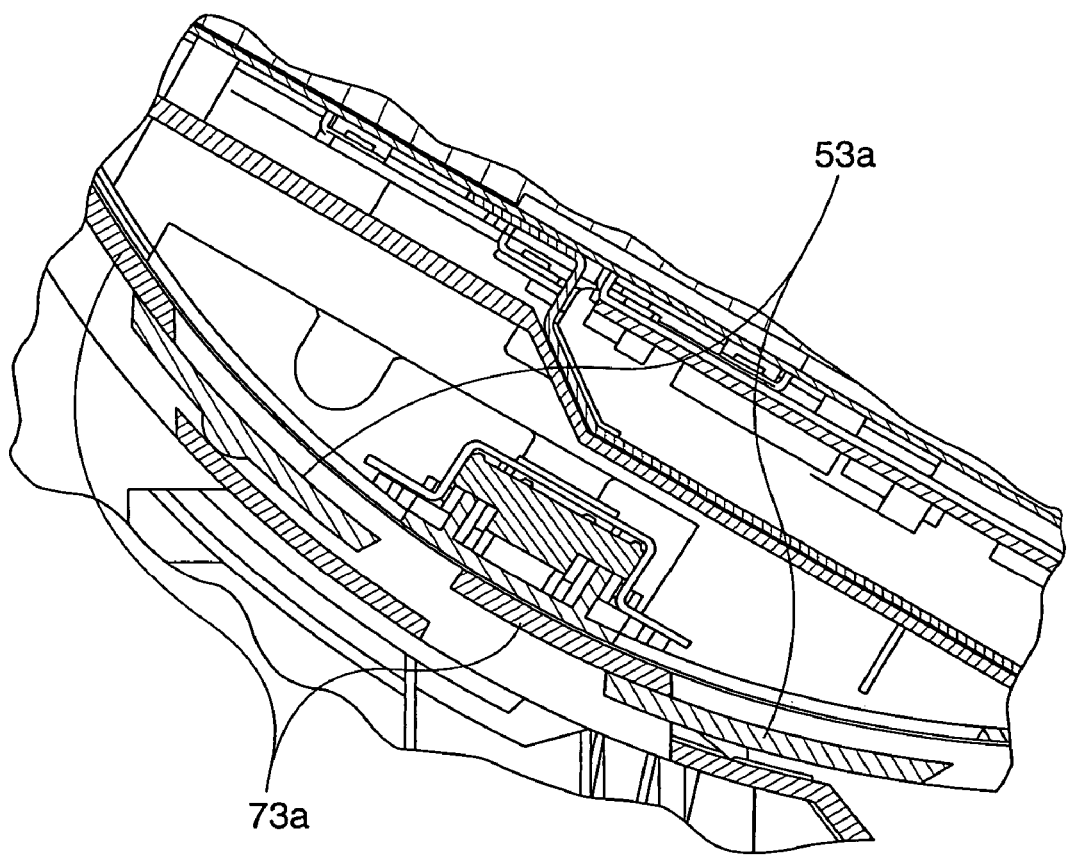
FIG. 9 is an enlarged view of part of FIG. 8.
Figure 10:
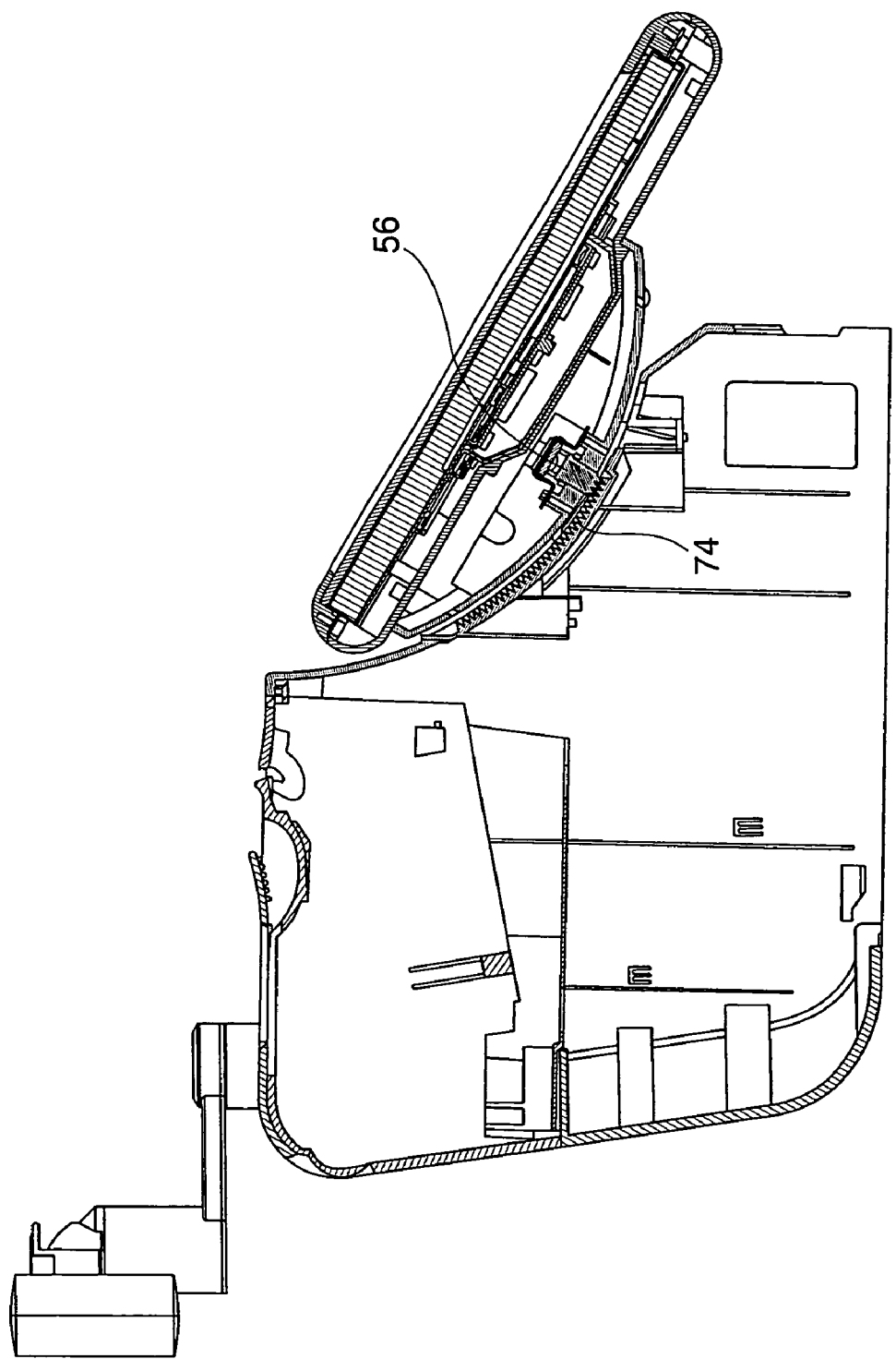
FIG. 10 is a section view through the positioning claw and mating teeth when the POS terminal is placed horizontally.
Figure 11:
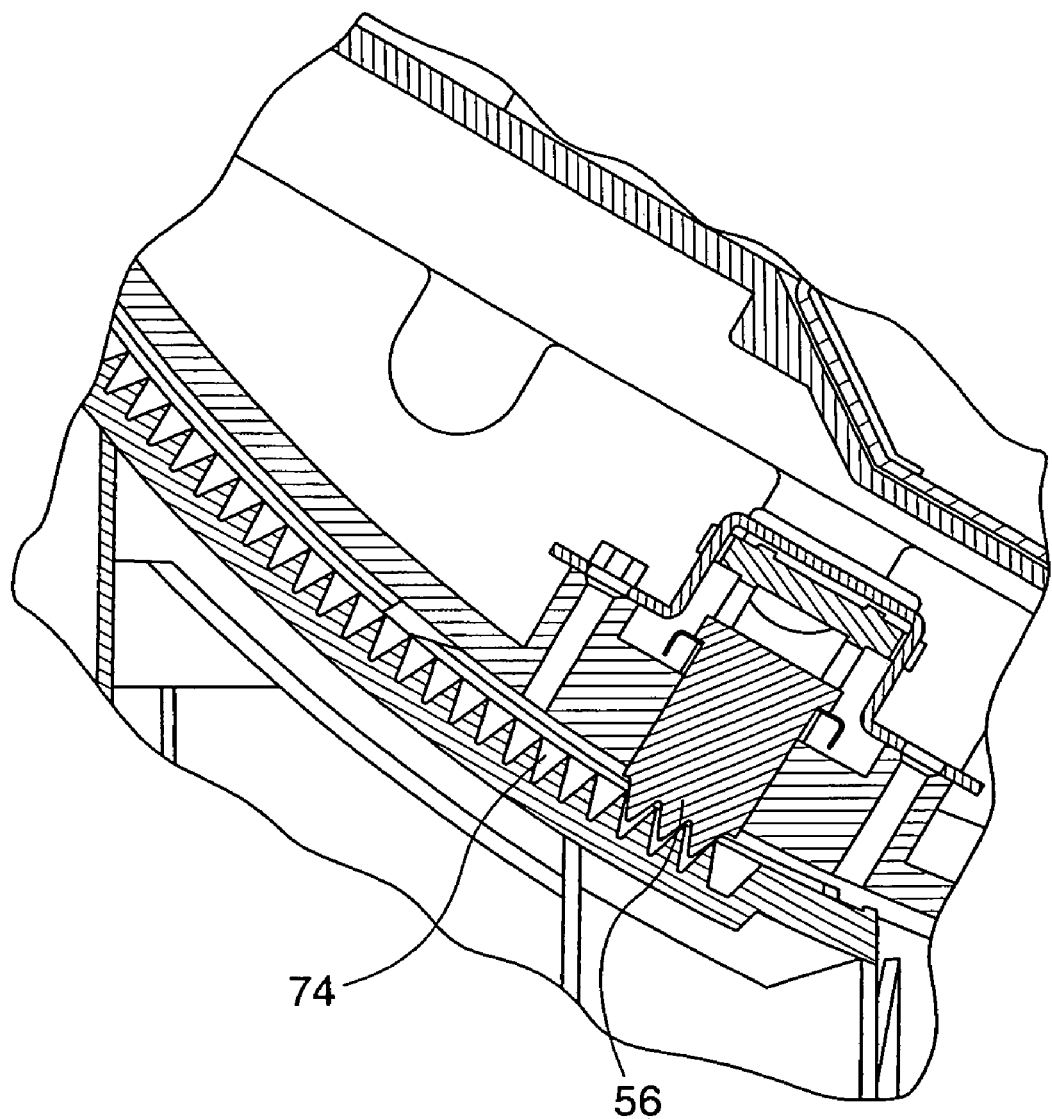
FIG. 11 is an enlarged view of part of FIG. 10.

The sliding mechanism of the display device mounting unit 70 and mounting member 50 when the display unit is mounted to the main unit 20 is described next with reference to FIG. 8 to FIG. 11. FIG. 8 is a vertical section view through a plane passing through slide rail 53a and guide rails 73a when the POS terminal 10 is placed horizontally, and FIG. 9 is an enlarged view of a part of FIG. 8. FIG. 10 is a vertical section view through the positioning claw 56 and rack 74 when the POS terminal 10 is placed horizontally, and FIG. 11 is an enlarged view of a part of FIG. 10. As shown in FIG. 8 and FIG. 9, the slide rail 53a of the mounting member 50 is inserted between the top and bottom guide rails 73a and can slide up and down underneath the guide rails 73a.

FIG. 10 and FIG. 11 show the outside ends of the positioning claw 56 in the locked position meshed with the rack 74. The angle adjustment lever 59 shown in FIG. 14 can be moved circularly in the direction of arrow A pivoting on the internal pivot point 90 as described above, but is normally pressed to a specific position (the home position) by the coil spring 94. Moving the angle adjustment lever 59 in the direction of arrow A in FIG. 14 towards the display device 30 unlocks the positioning claw 56 and allows the leaf spring 96 to retract the positioning claw 56 to the inside. More specifically, moving the angle adjustment lever 59 in the direction of arrow A in FIG. 5 from the position shown in FIG. 11 allows the positioning claw 56 to move upward so that the positioning claw 56 separates from (disengages) the rack 74. The positioning claw 56 is thus unlocked and the angle of the display device 30 can be adjusted.

When the angle adjustment lever 59 is then released, the force of the coil spring 94 returns the angle adjustment lever 59 and positioning claw 56 to the home position (that is, away from the display device 30), and the positioning claw 56 thus meshes with the rack 74 again as shown in FIG. 11. The display unit is thus locked in position and cannot slide.

As described above, the tilt angle is held at a particular set angle because the ends of the positioning claw 56 remain meshed with the rack 74 unless the positioning claw 56 is moved by operating the angle adjustment lever 59.

Figure 12:
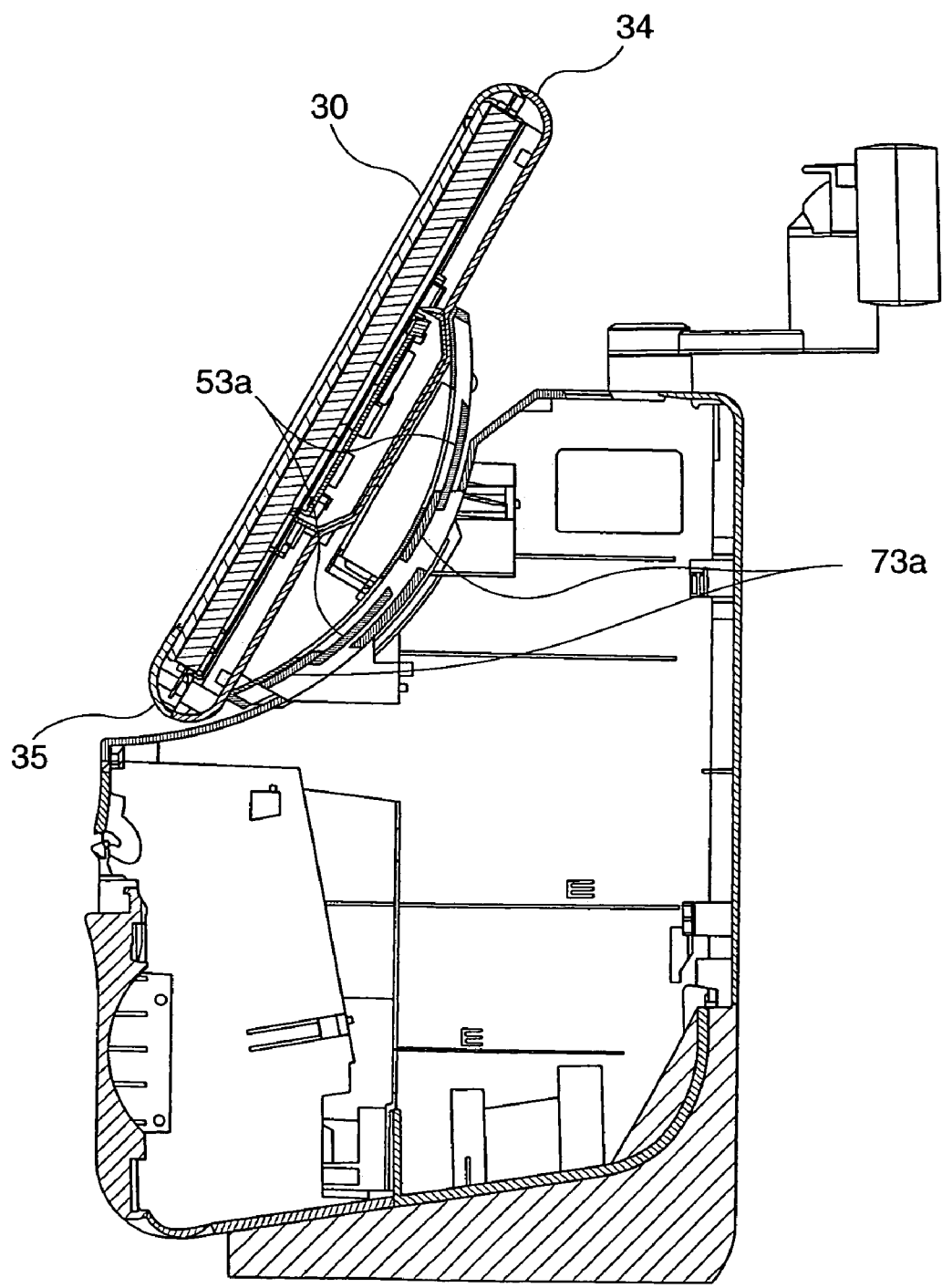
FIG. 12 is a vertical section view through the guide rails when the POS terminal is placed upright.

FIG. 12 is a vertical section view showing the guide rails when the POS terminal 10 is placed in the upright position. When in this upright position the mounting member 50 is fastened near the bottom end part 35 of the display device 30. The structure of the mounting member 50 and display device mounting unit 70 is the same whether the POS terminal 10 is placed horizontally or upright as shown in FIG. 12, and only the location where the mounting member 50 is fastened to the back of the display device 30 changes. The orientation of the mounting member 50 is reversed 180 degrees, however, and the rails are therefore longitudinally symmetrical. By thus rendering the guide rails longitudinally symmetrical, the display device 30 can slide along the curved recessed portion 71 by operating the angle adjustment lever 59 as described in FIG. 10 and FIG. 11, and the display device 30 can be held in a specific position by the positioning claw 56.

Figure 13:
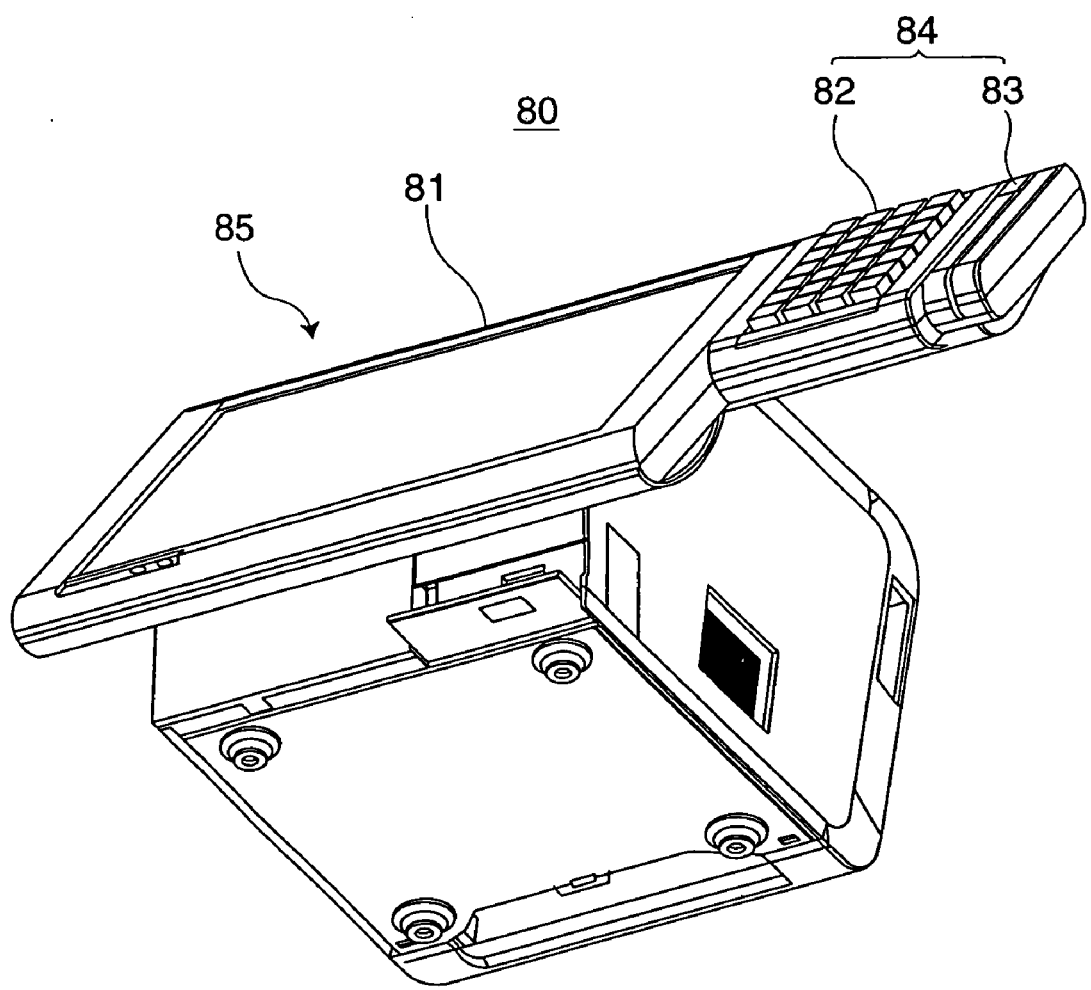
FIG. 13 is a bottom perspective view of a POS terminal according to another embodiment of the invention.

FIG. 13 is a perspective view from the bottom of a POS terminal 80 according to another embodiment of the invention. This POS terminal 80 has a display and operating device 85 comprising an operating unit 84 composed of a keyboard 82 and card reader 83 as input device (peripheral device) directly connected to the display device 81. The mounting member 50 (not shown in the figure) of the present invention is fastened to the back of the display device 81. Whether in the upright or horizontal position, the mounting member 50 and display device mounting unit 70 of the present invention enable mounting the display and operating device 85 to the main unit 20 without inverting the top and bottom of the display and operating device 85 while the operating unit 84 remains attached to the right side of the display device 81. The mounting member 50 and display device mounting unit 70 of the present invention thus enable using the same display and operating device 85 in both vertical and horizontal orientations. A touch panel can also be provided as the input device connected to the display device.

This embodiment of the invention thus enables attaching the display device to the main unit in both upright and horizontal orientations while peripheral devices remain connected, and thus makes changing between the upright and horizontal orientations simple. Furthermore, because different peripheral devices and display devices are not required for vertical and horizontal installations, production costs associated with changing peripheral devices can be reduced. Different display device connectors and interface units are also not needed for vertical and horizontal placement, and the size can therefore be reduced.

The top to bottom length of the display device is greater than the length of the curvature of the mounting member in the embodiments described above. If the top to bottom length of the display device is substantially equal to the length of the distance between end parts 60 and 61 of the mounting member (as shown in FIG. 6), however, the ends of the mounting member will be at the ends of the display device and will not interfere with sliding the display device. In this situation it is not necessary to change the position of the mounting member according to the vertical or horizontal placement of the main unit.

The mounting member is fastened by screws to the display device in the embodiments described above, but other known methods, such as using hooks or claws, snap-fit connectors, or even double-sided adhesive tape, could be used instead. Using screws enables fastening the mounting member to the display device easily, accurately, and reliably. Using claws or snap-fit connectors enables very easy attachment of the mounting member.

Instead of attaching the mounting member to the display device using screws, claws, or other type of fastener, the mounting member could be assembled so that it can slide up and down on the back of the display device. In this case the mounting member can be moved and secured so that the top or bottom end of the mounting member is at the bottom or top end of the display device according to the vertical or horizontal placement of the main unit.

Customer Display Device

Figure 16:
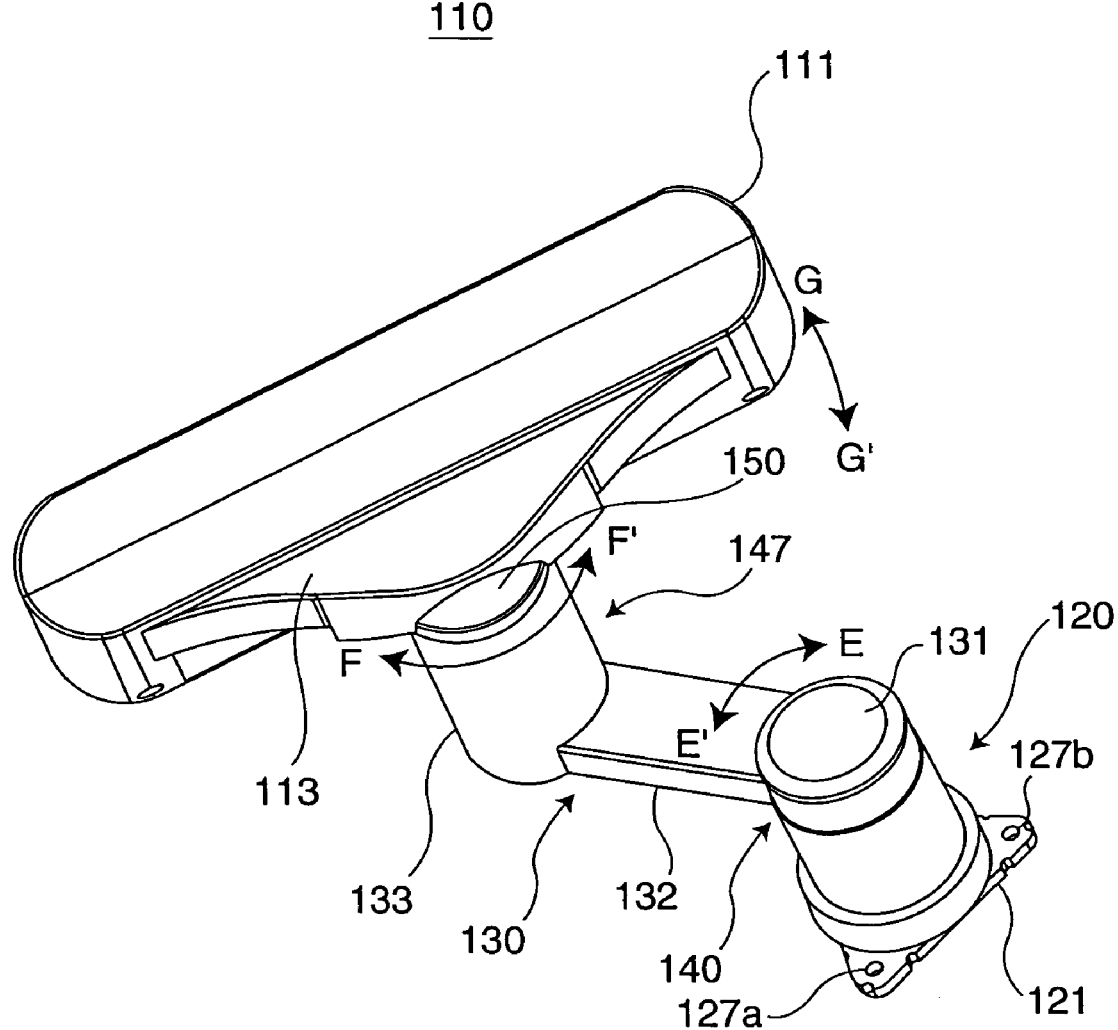
FIG. 16 is a perspective view of a customer display device according to a preferred embodiment of the invention.
Figure 17:
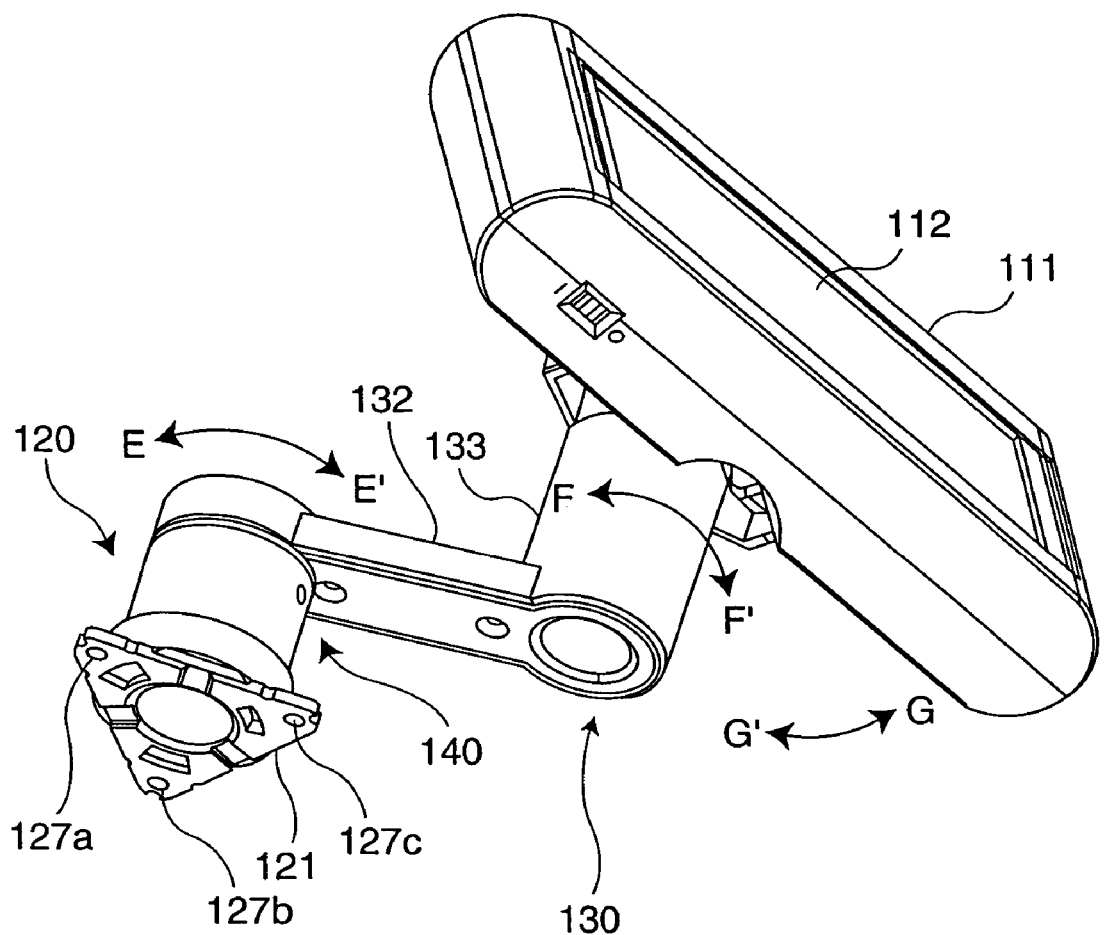
FIG. 17 is a perspective bottom view of the customer display device shown in FIG. 16.

FIG. 16 is a perspective view of a customer display device 110 according to a preferred embodiment of the invention, and FIG. 17 is a perspective view from below the customer display device 110 shown in FIG. 16. As shown in FIG. 16 and FIG. 17, this customer display device 110 has a mounting column 120 for mounting and securing the customer display device 110 to the POS terminal, an L-shaped support arm 130 pivotally connected to the mounting column 120, and a customer display unit 111.

The mounting column 120 has a mounting plate 121, and is fastened to the POS terminal by screws passing through screw holes 127a, 127b, and 127c rendered in the mounting plate 121.

The other end of the mounting column 120 is connected to the L-shaped support arm 130 by a first connector unit 140 enabling the L-shaped support arm 130 to move circularly in the direction indicated by arrow E-E'. The first connector unit 140 is covered by the connector unit cover 131 of the L-shaped support arm 130. The bottom end of support column 133 is fixed at the other end of the arm portion 132 of the L-shaped support arm 130. This support column 133 is substantially parallel to the mounting column 120.

A pivoting connector unit 150 is rendered at the top end of the support column 133. This pivoting connector unit 150 constitutes a second connector unit 147 enabling the display unit connected thereto to move circularly in the direction indicated by arrow F-F'. The display unit 111 is connected to the end of the pivoting connector unit 150.

A display panel 112 is disposed to the front of the display unit 111, and a tiltable connection unit 113 rendered on the back of the display unit 111 enables adjusting the tilt angle of the display unit 111. The end of the second connector unit 147 is connected to the tiltable connection unit 113, and the display unit 111 is mounted so that the display unit 111 can pivot on the L-shaped support arm 130 in the direction of arrow F-F' and the tilt angle can be adjusted in the direction of arrow G-G'.

The display unit 111 can therefore pivot on the mounting column 120 through a radial range equal to the length of the arm portion 132 by moving the connector unit cover 131 circularly. The pivoting connector unit 150 also enables pivoting the display unit 111 on the support column 133 as well as adjusting the tilt angle of the display. As a result, the display unit 111 can be easily adjusted for optimal viewing. The height of the display unit 111 can also be adjusted using the length of the mounting column 120 and support column 133. More specifically, the range of display unit 111 movement can be determined by adjusting the length of the mounting column 120, arm portion 132, and support column 133.

The freedom of customer display installation can therefore be increased while maintaining the functionality of the customer display by appropriately adjusting the length of the mounting column 120, arm portion 132, and support column 133 according to the installation environment and the design of the POS terminal to which the customer display is installed.

Mounting the Customer Display

Figure 18:
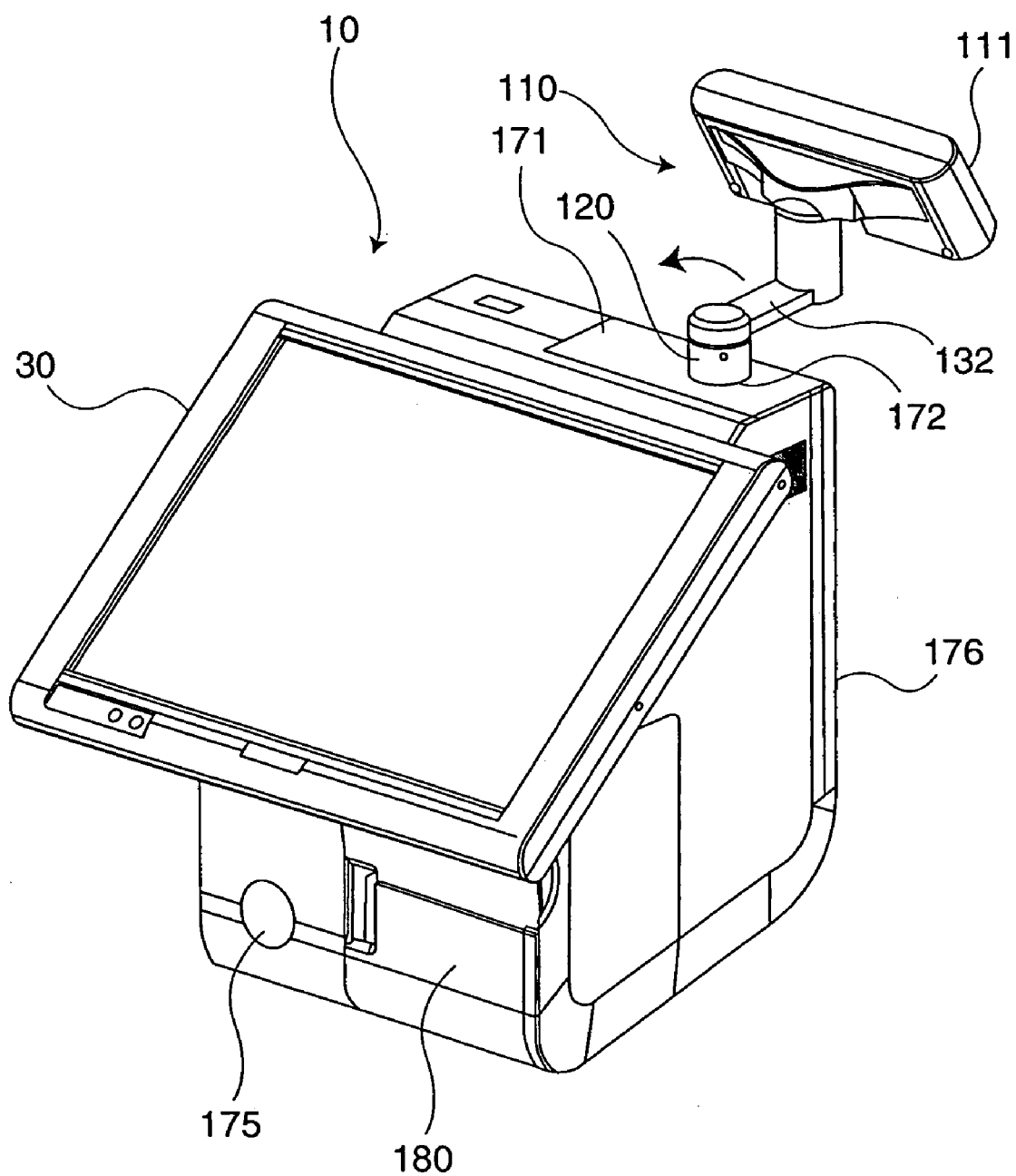
FIG. 18 is a perspective view showing the customer display device mounted to the POS terminal in the upright position.
Figure 19:
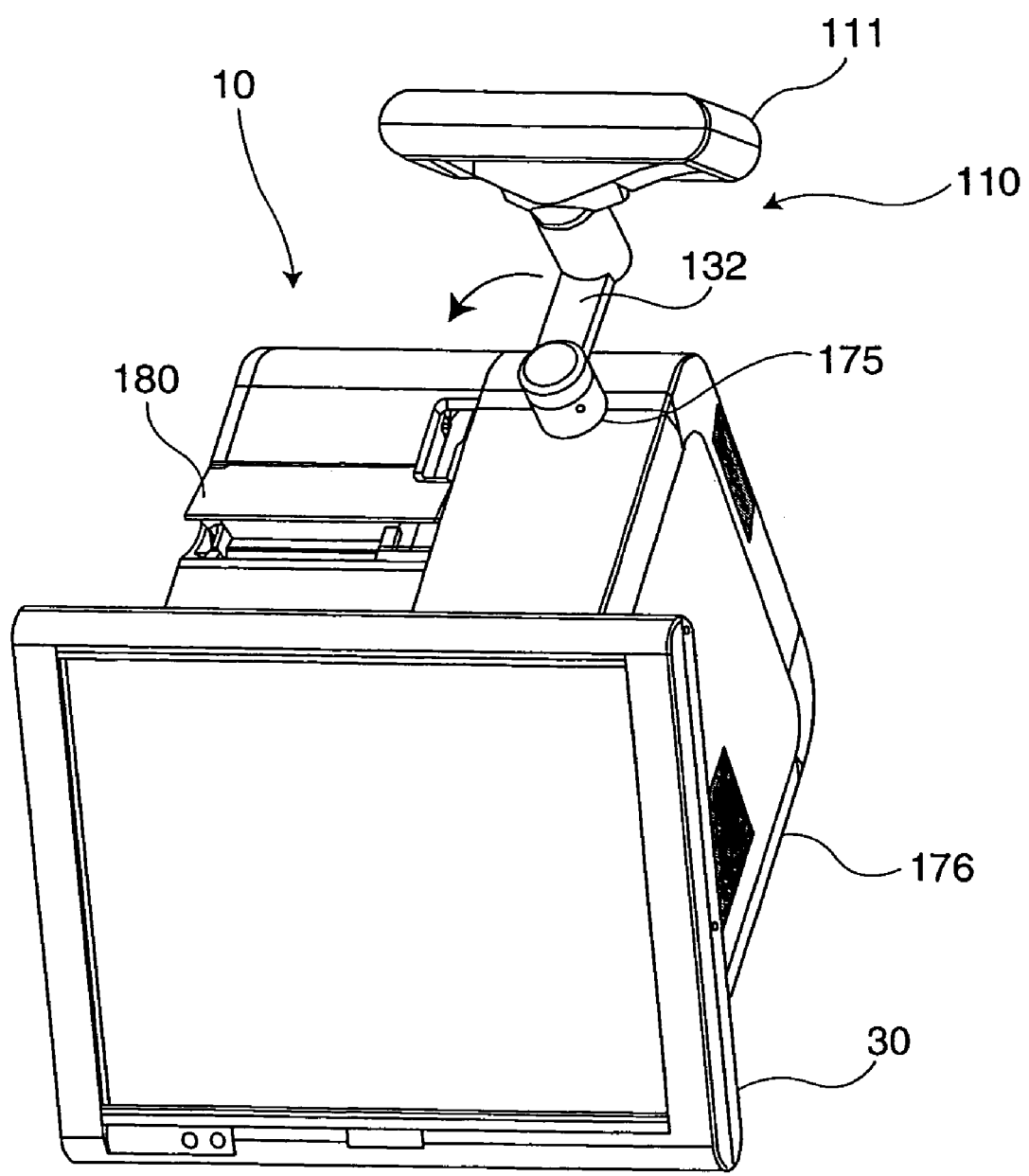
FIG. 19 is a perspective view showing the customer display device mounted to the POS terminal in the horizontal position.

FIG. 18 and FIG. 19 show an example of a POS terminal that can be used in either a vertical or horizontal orientation with the customer display device 110 shown in FIG. 16 and FIG. 17 mounted on the POS terminal. FIG. 18 shows the customer display device 110 mounted to a POS terminal in the upright orientation, and FIG. 19 shows the customer display device 110 mounted to a POS terminal in the horizontal orientation.

In FIG. 18 the mounting column 120 of the customer display device 110 is inserted and secured in a display mounting unit 172 rendered at the top right side of the POS terminal. The mounting plate 121 on the bottom of the mounting column 120 is secured by screws (not shown in the figure) to the frame of the POS terminal inside the cover 171. The display device 30 is disposed to the top front part of the POS terminal 10, and a printer 180 is disposed at the bottom front of the POS terminal 10. A display mounting unit 175 that is used when the POS terminal 10 is placed horizontally is located on the left side of the printer 180 as seen in FIG. 18.

FIG. 19 is a perspective view of the POS terminal 10 shown in FIG. 18 when the POS terminal 10 is used in the horizontal orientation. In the upright position (see FIG. 18) side 176 of the POS terminal 10 is the back. In the horizontal position (FIG. 19), side 176 is the bottom and the printer 180 and display mounting unit 175 are located on top, and the mounting plate 121 of the customer display device 110 is secured to display mounting unit 175.

The customer display device 110 according to this embodiment of the invention enables moving the display unit 111 around the mounting column 120 within the range of movement of the arm portion 132. Therefore, if there is a wall on the right side of the POS terminal 10 installation, the display unit 111 can be moved to the left to a position that is easier for the customer to view by simply moving the L-shaped support arm 130 circularly in the direction of the arrows. The position of the customer display device 110 can also be easily changed as needed by the design of the installation space and any other nearby equipment.

If the POS terminal unit is smaller and the display device 30 is larger, the top of the POS terminal may be completely covered by the display device 30, in which case a conventional upright customer display device cannot be installed. The customer display device 110 according to this embodiment of the invention can be installed without interfering with the display device 30, however, by shortening the mounting column 120 and lengthening the arm portion 132.

Construction of the Connection Units

The construction of the connection units is described next with reference to FIG. 20 to FIG. 23.

Figure 20:
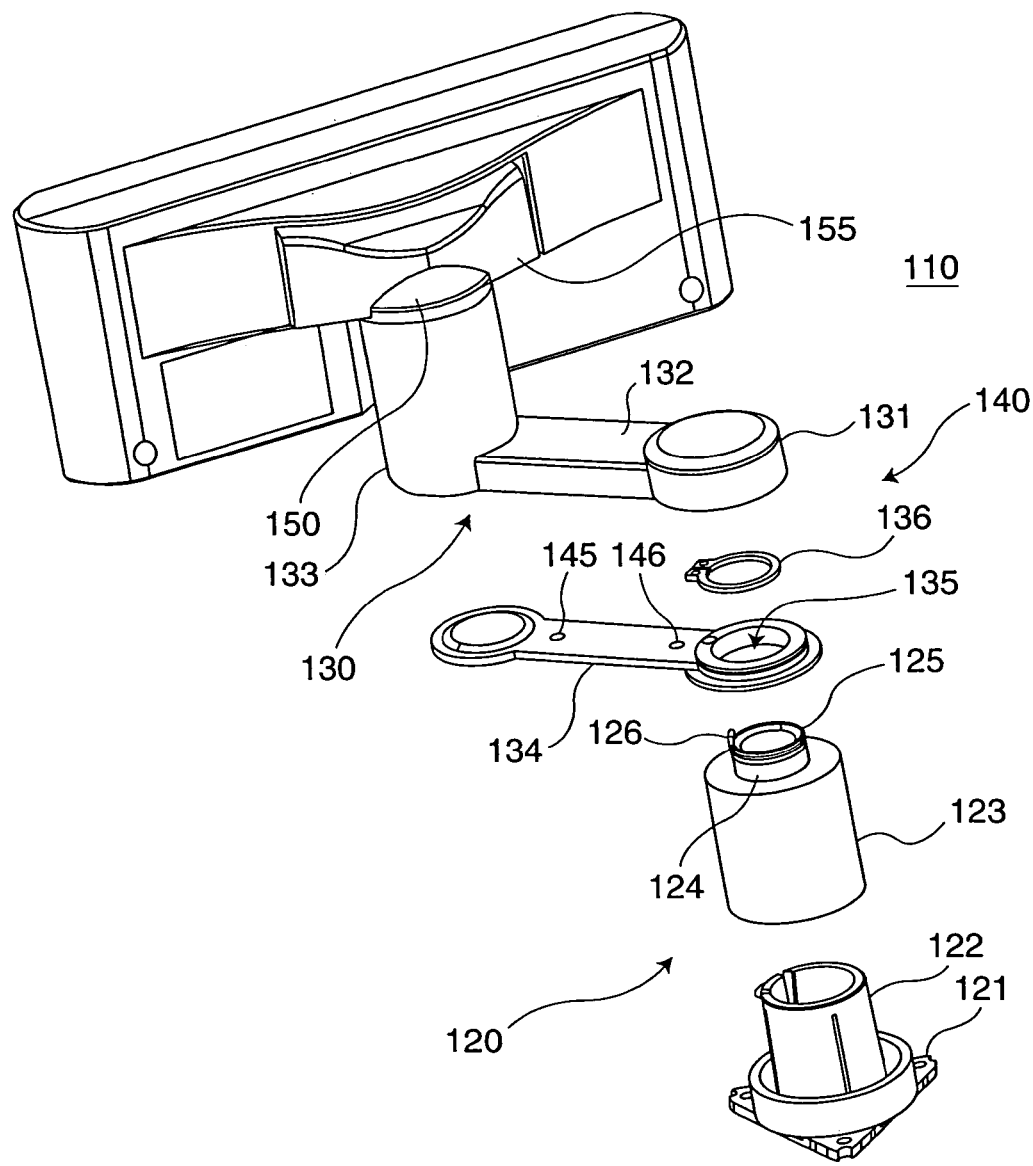
FIG. 20 is an exploded perspective view showing the arrangement of the support column and the connection unit of the L-shaped support arm.

FIG. 20 is an exploded perspective view showing the construction of the connection unit for the mounting column 120 and L-shaped support arm 130.

The mounting column 120 comprises an inside column 122 to which the mounting plate 121 is attached, and an outside sleeve 123 that fits over and is fixed to the inside column 122. The outside sleeve 123 has a protruding annular part 124 with an E-ring channel 125 on the top.

The L-shaped support arm 130 comprises a connector unit cover 131, an arm portion 132, a support column 133, a bottom cover 134, and an E-ring 136.

The protruding annular part 124 is passed through a mounting hole 135 rendered in the end of bottom cover 134, and the E-ring 136 is then fit into the E-ring channel 125 to attach the bottom cover 134 pivotally to the outside sleeve 123. The bottom cover 134 is then attached to the arm portion 132 using screws passing through screw holes 145 and 146. The arm portion 132 is formed integrally with the connector unit cover 131 and support column 133, and the L-shaped support arm 130 can thus pivot on the mounting column 120. The connector unit cover 131, protruding annular part 124, and E-ring 136 thus constitute the connection unit (first connector unit 140) enabling the L-shaped support arm 130 to pivot on the mounting column 120. The connector unit cover 131 of the L-shaped support arm 130 constitutes a pivot unit that moves circularly around the stationary protruding annular part 124.

Figure 21:
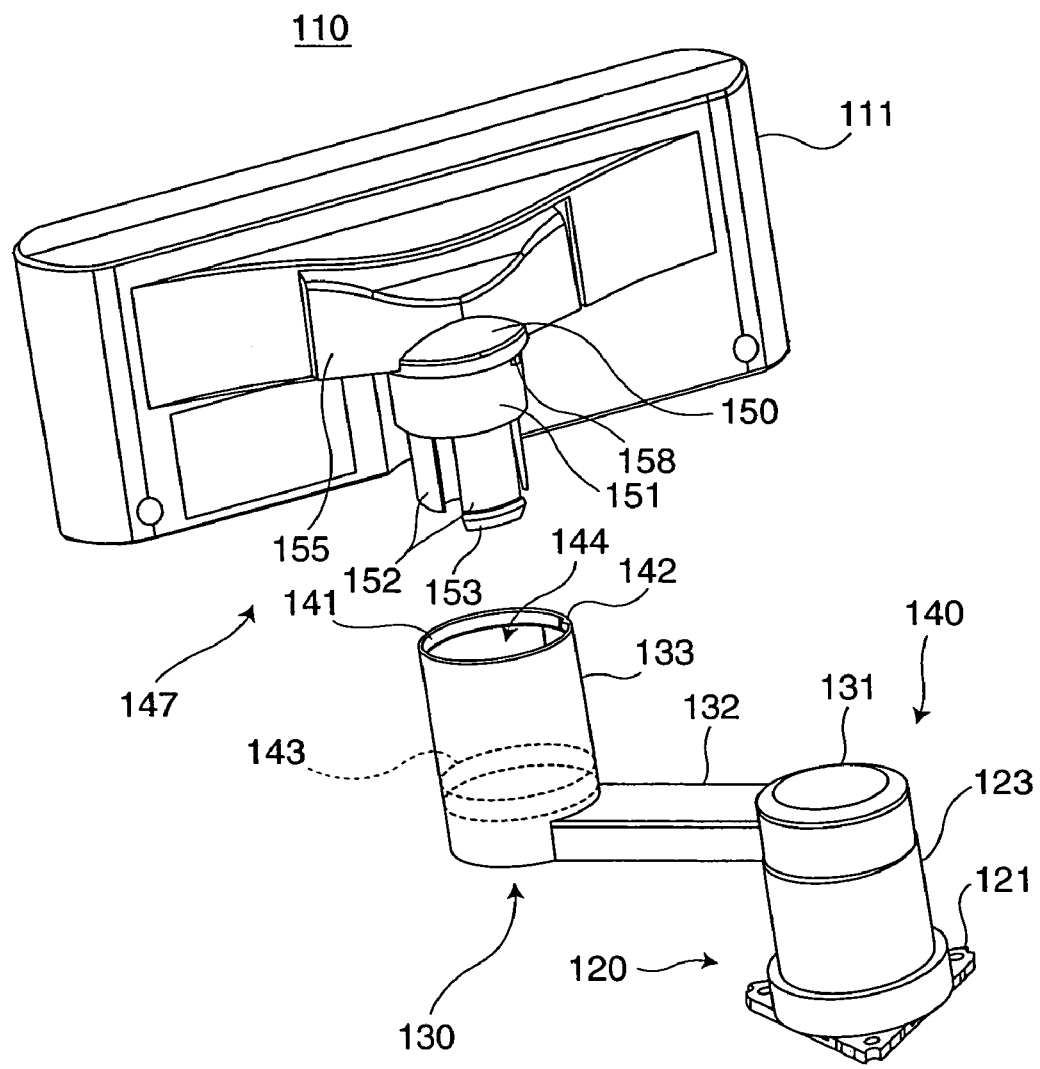
FIG. 21 is an exploded perspective view showing the arrangement of the connector unit for pivotally connecting the L-shaped support arm and the display unit.

FIG. 21 is an exploded perspective view showing the connector unit (second connector unit 147) pivotally connecting the L-shaped support arm 130 and the display unit 111.

The support column 133 of the L-shaped support arm 130 is a hollow cylinder. The annular sliding portion 151 and the flexible annular fingers 152 of the pivoting connector unit 150 are inserted from the top opening 144 into the support column 133. A claw 153 is rendered on the distal end of at least one of the annular fingers 152. An annular rib 143 is rendered on the inside surface of the support column 133 of the L-shaped support arm 130.

When the annular sliding portion 151 and annular fingers 152 of the pivoting connector unit 150 are inserted from the top opening 144 of the support column 133, the annular fingers 152 are elastically deformed so that the claw 153 rides over and under the annular rib 143. The claw 153 thus catches the annular rib 143 and holds the pivoting connector unit 150 in the support column 133. The pivoting connector unit 150 can thus pivot on the L-shaped support arm 130 with the annular sliding portion 151 of the pivoting connector unit 150 sliding along the inside surface of the support column 133 and the claw 153 sliding along the annular rib 143. The pivoting connector unit 150 thus moves circularly on the support column 133, and together these constitute the second connector unit 147.

Figure 22A:
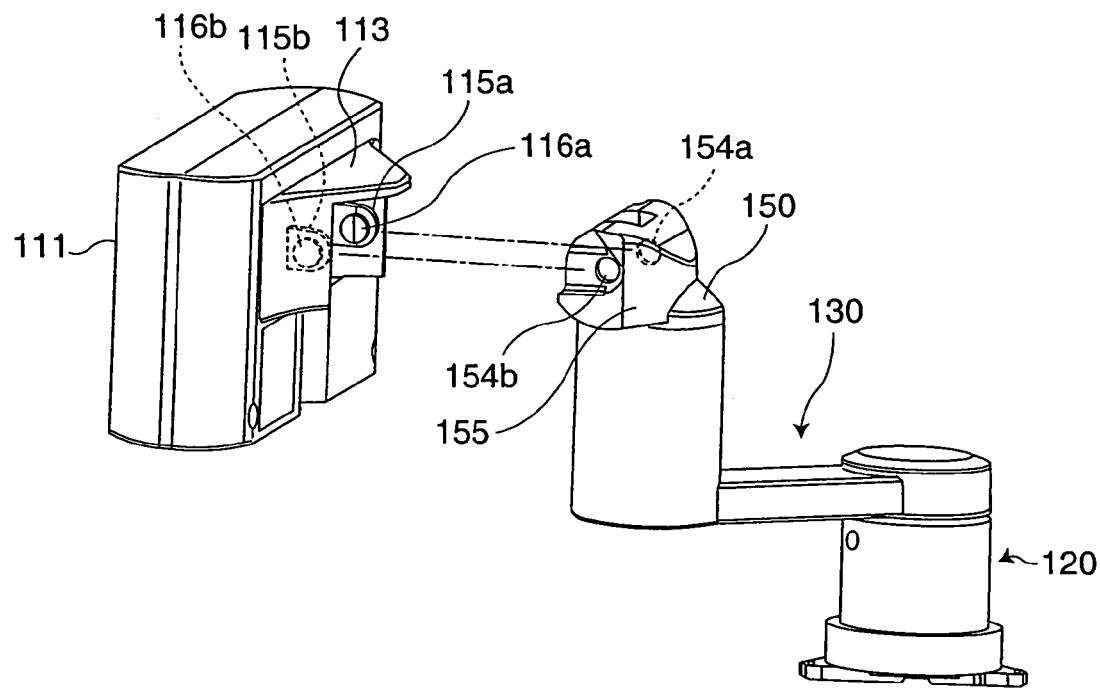
FIG. 22A is an exploded perspective view showing the arrangement of the tilt mechanism for connecting the display unit and the pivoting connector unit.
Figure 22B:
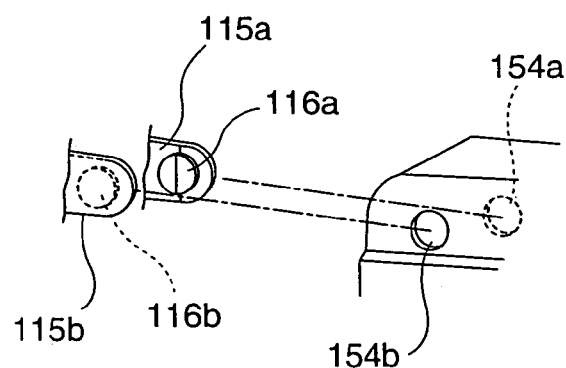
FIG. 22B is a partial perspective view schematically showing the construction of the connector unit.

FIG. 22A is an exploded perspective view showing the tilt mechanism connecting the display unit 111 to the pivoting connector unit 150, and FIG. 22B is a partial perspective schematic view showing the connecting mechanism of the connector unit.

The pivoting connector unit 150 comprises a display connection unit 155 in which tilt connector holes 154a and 154b are formed. Two mounting trunnions 116a and 116b disposed to the display unit 111 are inserted to tilt connector holes 154a and 154b. The tiltable connection unit 113 is disposed to the display unit, and support units 115a and 115b are rendered inside the tiltable connection unit 113 to support the trunnions 116a and 116b. The trunnions 116a and 116b of the display unit 111 fit into the tilt connector holes 154a and 154b of the display connection unit 155 so that the tilt angle of the display unit 111 can be adjusted.

Limiting the Pivot Angle

As described above, the L-shaped support arm 130 and pivoting connector unit 150 can pivot using the mounting column 120 and support column 133, respectively, as the axis of rotation. In order to display content on the display panel 112 of the display unit 111, however, a power cable and data cable must be connected to the display unit 111. As a result, if the L-shaped support arm 130 or pivoting connector unit 150 is rotated multiple times in the same direction, the cables will become twisted and the internal components may become tangled, eventually resulting in electrical shorts or other damage. This embodiment of the invention therefore limits the angle of rotation in each of the pivot parts.

Figure 23:
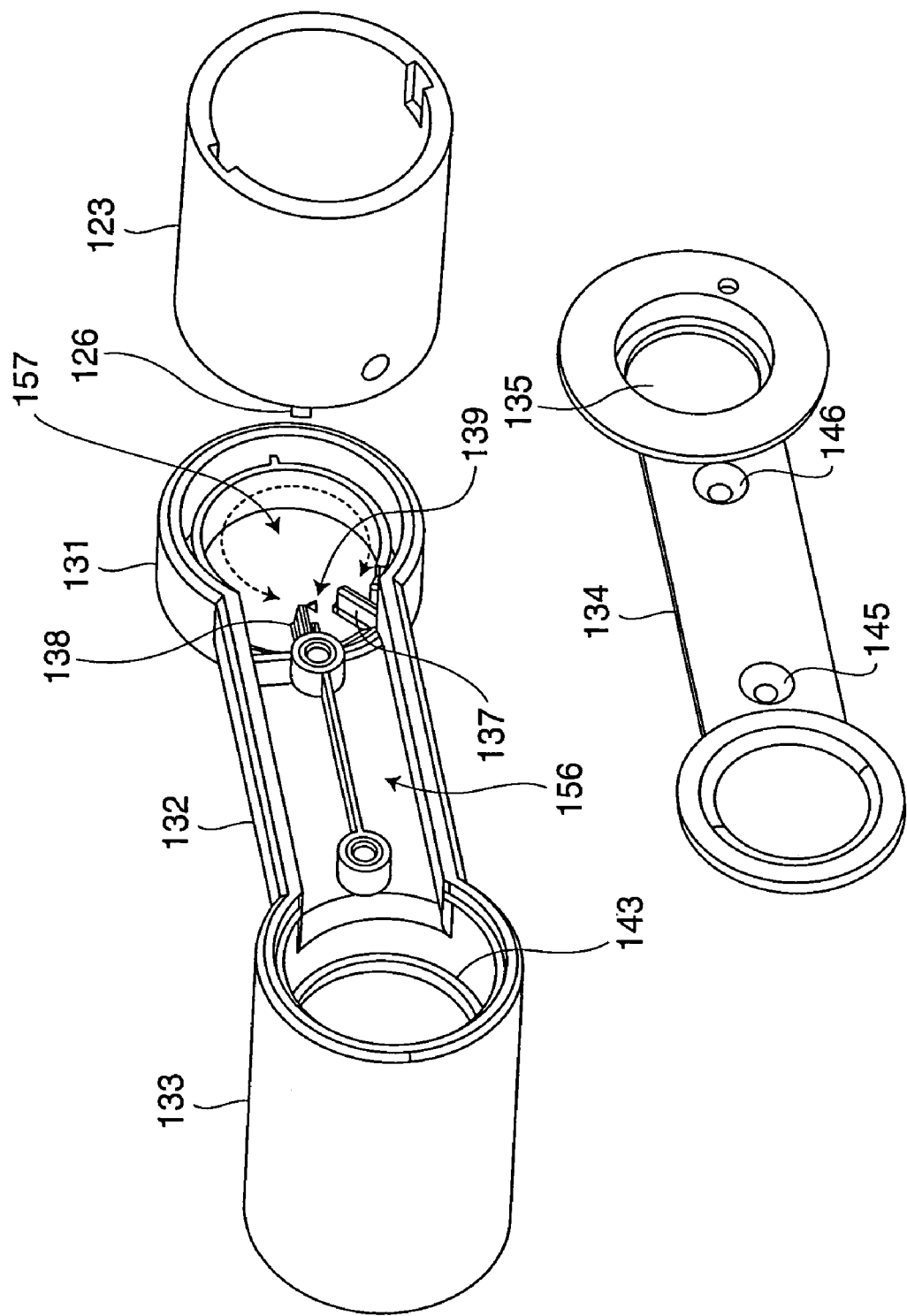
FIG. 23 is a bottom perspective view showing the showing the L-shaped support arm with the bottom cover removed.

This is described further with reference to FIG. 20, FIG. 21, and FIG. 23. FIG. 23 is a bottom perspective view of the L-shaped support arm 130 with the bottom cover 134 removed. As shown in FIG. 20 and FIG. 23, a protruding stop (stop member) 126 is rendered on the end of the E-ring channel 125 in the outside sleeve 123, and a first rotation prevention stop 137 and second rotation prevention stop 138 that engage stop member 126 when the L-shaped support arm 130 pivots are rendered inside the connector unit cover 131 of the L-shaped support arm 130.

As a result, when the L-shaped support arm 130 pivots to a predetermined angle, the stop member 126 contacts the first rotation prevention stop 137 or second rotation prevention stop 138 and thus stops further movement of the L-shaped support arm 130. The pivot range of the L-shaped support arm 130 is limited to the angle of rotation denoted by the dotted line in FIG. 23 between the first rotation prevention stop 137 and second rotation prevention stop 138. This angle of rotation can be set as desired by changing the positions of the first rotation prevention stop 137 and second rotation prevention stop 138. The angle of rotation can be limited to 360 degrees by providing only one rotation prevention step.

The cables pass from inside the POS terminal through the internal cavity of the inside column 122 of the mounting column 120 (see FIG. 20), and are guided through internal cavity 157 in connector unit cover 131, the inside 156 of the arm portion 132, and into the space inside the support column 133 (note that the cables are not shown in the figures). Because the cables are guided from the internal cavity 157 of the connector unit cover 131 to the inside 156 of the arm portion 132 through cable way 139, the cables will not be twisted by rotation of the L-shaped support arm 130 or pinched by the stop member 126.

The rotation prevention mechanism of the pivoting connector unit is described next with reference to FIG. 21. A rotation prevention rib (rotation prevention stop) 158 protruding slightly from the sliding surface is rendered near the top end of the annular sliding portion 151 of the pivoting connector unit 150. An annular channel 141 of a depth corresponding to the protrusion of the rotation prevention rib 158 is also rendered near the inside top end of the support column 133 of the L-shaped support arm 130. A rotation stop 142 protruding slightly toward the center is rendered inside the annular channel 141. As a result, the rotation prevention rib 158 engages the rotation stop 142 when the pivoting connector unit 150 turns approximately 360 degrees, thus preventing the pivoting connector unit 150 from turning more than 360 degrees.

This embodiment of the invention is described above as supporting the display unit by means of a mounting column 120 and L-shaped support arm 130, but the invention shall not be so limited. More specifically, the display device of the present invention can be achieved by linking a first support column corresponding to the mounting column 120 to a second support column corresponding to the support column 133 of the L-shaped support arm 130 by an arm member corresponding to the arm portion 132.

The pivoting connector unit of this embodiment shall also not be limited to the location described above. More particularly, a pivotable mounting unit can be used to connect the first support column to the main unit, and a pivotable connector unit can be used to connect the bottom part of the second support column to the arm unit. The length of the first support column and second support column can also be set as desired, and various technologies known from the literature can be used to render the pivoting connector unit.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data processing device having a main unit that can be positioned and used vertically or horizontally, and a display device mounted to the front of said main unit, said data processing device comprising:
   a display device mounting unit that is attached to, or incorporated into the housing of said main unit, comprising a curved recessed portion facing the operator forming an arc recessed diagonally from the front part of said main unit toward the inside of said main unit, on which guide rails are attached or incorporated along the arc of said curved recessed portion; and
   a mounting member comprising a convex curved surface which in section has a matching radius of curvature with said curved recessed portion, on which slide rails are attached or incorporated into the convex curved surface, said slide rails coupling and operating in conjunction with said guide rails;

wherein said mounting member is attached to a back of said display device, and when said main unit is placed vertically and horizontally, said display device can be mounted to said display device mounting unit by coupling said slide rails to said guide rails without reversing the top and bottom of said display device, and the tilt angle of said display device can be adjusted by sliding said slide rails along said guide rails.

2. The data processing device of claim 1, wherein when the top to bottom length of said display device is greater than the distance between the ends of said curvature of said mounting member, the installation position of said mounting member is changed according to the vertical or horizontal placement of said main unit so that one end of said mounting member is attached near the bottom end or top end of said display device, in order to permit said display device to tilt at a plurality of angles when installed onto said display device mounting unit.

3. The data processing device of claim 2, wherein said mounting member is removably attached to said display device.

4. The data processing device of claim 2, wherein said mounting member is mounted movably to said display device, to permit the top end or bottom end of said mounting member to be near either the bottom end or top end of said display device, depending on whether said main unit is horizontally or vertically positioned.

5. The data processing device of claim 2, wherein said mounting member is removably attached to said display device by one or more objects from the group consisting of screws, hooks, claws, snap-fit connectors, adhesive connectors, hook-and-loop connectors, and screws with elongated brackets permitting said mounting member to be readily adjusted to be near the top or bottom end of said display device.

6. The data processing device of claim 1, wherein the display device comprises an input device.

7. The data processing device described in claim 1, wherein a customer display device mounting unit is removably attached to said main unit in order to be situated on the top part of said main unit, whether said main unit is horizontally or vertically positioned.

8. The data processing device of claim 7, wherein said customer display device mounting unit comprises:
a first support column and a second support column substantially parallel to each other and separated from each other by a space;
an arm connecting the top end of said first support column to the bottom end of said second support column, the length of which sets the distance between said support columns;
said first support column removably attachable to said main unit;
said customer display device removably attached to the top end of said second support; and
a connector unit pivotally attaching said arm to said first support column, permitting horizontal rotation of said customer display device at a plurality of angles.

9. The data processing device of claim 8, wherein said arm and said second support column are integrally formed in an L-shaped configuration.

10. The data processing device of claim 8, wherein said connector units incorporate a rotation stop mechanism preventing the rotation of any of said pivoting attachments from rotating more than a predetermined angle of rotation.

11. The data processing device of claim 10, wherein said rotation stop mechanism comprises a rotation prevention rib incorporated into said pivotally attached connector unit, and a stop attached to the mating surface of said connector unit that contacts said rotation prevention rib when said connector unit rotates to a predetermined angle.

12. The data processing device of claim 8, wherein a second connector unit pivotally attaches said arm to said second support column, permitting horizontal rotation of said customer display device at a plurality of angles.

13. The data processing device of claim 8, wherein a second connector unit pivotally attaches said second support column to said customer display device, permitting horizontal rotation of said customer display device at a plurality of angles.

14. The data processing device of claim 8, wherein said first connector unit pivotally attaches said first support column to said main unit.

15. The data processing device of claim 8, wherein said customer display device is horizontally pivotally attached to the top end of said second support column, permitting vertical tilting of said customer display device at a plurality of angles.

16. The data processing device of claim 1, wherein a card reader is attached to said display device.

17. The data processing device of claim 1, wherein a keyboard is attached to said display device.

18. The data processing device of claim 1 wherein said mounting member incorporates an angle locking mechanism and lever that permits the operator to:
engage said angle locking mechanism with said display device mounting unit to fix the angle of the display device with respect to the main unit;
disengage said angle locking mechanism from said display device mounting unit to permit said mounting member to slide with respect to said display device mounting unit, allowing said display device to be positioned in a plurality tilt angles with respect to said main unit.

19. The data processing device of claim 18, wherein manual depression of said lever occurs against a spring-loaded force, disengaging the contact between said angle locking mechanism and said device mounting unit, and wherein release of said lever causes it to resume its fully extended position, re-establishing contact between said angle locking mechanism and said device mounting unit.

20. The data processing device of claim 18, wherein said angle locking mechanism comprises
a retractable device, the outside surface of which is comprised of gear teeth, linked to said lever such that manually depressing said lever causes said retractable device to retract within said mounting member;
a curved rack, the outer surface of which comprises a plurality of gear teeth, oriented vertically and attached or incorporated along the arc of the curved recessed portion of said display device mounting unit;
said gear teeth on said retractable device and said curved rack constructed so as to mesh with each other on contact.

* * * * *